United States Patent [19]
Heimburger

[11] Patent Number: 5,995,154
[45] Date of Patent: Nov. 30, 1999

[54] PROCESS FOR INTERPOLATING PROGRESSIVE FRAMES

[75] Inventor: Catherine Heimburger, Strasbourg, France

[73] Assignee: Thomson multimedia S.A., Boulogne Cedex, France

[21] Appl. No.: 08/763,178

[22] Filed: Dec. 10, 1996

[30] Foreign Application Priority Data

Dec. 22, 1995 [FR] France .................................. 95 15404

[51] Int. Cl.⁶ ........................................................ H04N 7/01
[52] U.S. Cl. .......................... 348/448; 348/448; 348/449; 348/450; 348/451
[58] Field of Search .................................... 348/448, 449, 348/450, 451, 452, 443, 446, 447, 458, 910, 911

[56] References Cited

U.S. PATENT DOCUMENTS

| | | | |
|---|---|---|---|
| 5,208,667 | 5/1993 | Saunders | 348/452 |
| 5,488,421 | 1/1996 | Hwang et al. | 348/448 |
| 5,495,300 | 2/1996 | De Haan et al. | 348/452 |
| 5,504,531 | 4/1996 | Knee et al. | 348/452 |
| 5,534,946 | 7/1996 | De Haan et al. | 348/452 |
| 5,592,231 | 1/1997 | Clatanoff et al. | 348/452 |
| 5,631,706 | 5/1997 | Tsunashima | 348/452 |
| 5,784,114 | 7/1998 | Borer et al. | 348/452 |

FOREIGN PATENT DOCUMENTS

| | | |
|---|---|---|
| 0 395 267 | 10/1990 | European Pat. Off. . |
| 0 564 957 | 10/1993 | European Pat. Off. . |
| 0 650 293 | 4/1995 | European Pat. Off. . |
| 2 604 049 | 3/1988 | France . |
| 2 700 090 | 7/1994 | France . |

OTHER PUBLICATIONS

"Scan Rate Up–Conversions Using Adaptive Weighted Median Filtering", Haavisto, P. et al., Signal Processing of HDTV, pp. 703–710.

*Primary Examiner*—John K. Peng
*Assistant Examiner*—Paulos M. Natnael
*Attorney, Agent, or Firm*—Joseph S. Tripoli; Frederick A. Wein; Alexander J. Burke

[57] ABSTRACT

A process for converting interlaced frames into progressive frames comprising a change of frame frequency by interpolation and motion compensation, wherein when a motion vector associated with a pixel to be interpolated is non-zero or when the motion vector is zero but the confidence accorded to this vector is less than a given threshold, the interpolation of the pixel of a frame situated temporally between two input frames is carried out by a median filtering pertaining to the values obtained by a first motion compensated linear temporal filter, a second motion compensated linear filter, and a motion compensated median temporal filter.

16 Claims, 16 Drawing Sheets

○ PIXEL TO BE GENERATED

PROCESS FOR INTERPOLATING PROGRESSIVE FRAMES

FIELD OF THE INVENTION

The invention relates to a process for interpolating progressive frames. This process is particularly adapted to systems for converting images including a change of frame frequency, for example from a 50 Hz interlaced format to a 75 Hz progressive format. The invention applies in particular in the field of television.

BACKGROUND OF THE INVENTION

A present-day mass-market television receives and displays 25 images per second, each made up of two frames, one containing the even lines and the other the odd lines of the image; the screen is thus scanned vertically 50 times a second, this being a low frequency in relation to the reaction time of the eye. The limit frequency above which the eye would succeed in temporally resolving a televized sequence into a succession of discrete images is not much less than 50 Hz. By contrast, this flicker is virtually eliminated for a frame frequency of 75 Hz or better of 100 Hz; this latter solution therefore corresponds to a doubling of frequency.

The most obvious solution for achieving this frequency doubling consists simply in repeating twice on display each frame received; this is why such a device is termed 100 Hz AABB. It is also an interlaced display (the 312.5 even lines are displayed for 10 ms and then the 312.5 odd lines for the following 10 ms, etc.).

The shortcomings of such a simplistic algorithm quickly become apparent however; effective on stationary images, it proves to be tiring to the eyes if an object is shifting on the screen. A horizontally moving point is seen as if double, all the more so the greater its speed; this is due to the fact that it is observed by the eye along with the successive images as occupying one position twice and then a neighbouring position twice, etc (see FIG. 1). The systems for controlling the eye enabling it to follow a shifting object are highly disturbed by these irregularities, and do not allow it to identify the original motion clearly.

A good solution consists in detecting and calculating the motion of the various parts of the image and in calculating the intermediate images with the help of this information; this is the strategy which has been adopted here. The main defect of the 100 Hz AABB described above is thus corrected while preserving the suppression of flicker.

However, another defect of present-day television sets is linked with the interlacing of the lines displayed. In an image having good definition, a fine detail such as a line on the screen will, owing to the interlacing, only be displayed once every ½s of a second (see FIG. 2). A solution consists in displaying all the lines of the screen with each vertical scan, while reconstructing the non-transmitted lines by temporal or spatial interpolation. It could then be asked why not display 625 lines for each frame, with a renewal frequency of 100 Hz.

If the frame frequency of 100 Hz is retained, this amounts to again doubling the number of lines displayed per second, and hence to quadrupling the frequency of scanning the lines of the screen as compared with a conventional receiver: this is known as working at line frequency 4 H.

In a cathode-ray tube, the deflexion of the electron beam providing the scanning of the spot is controlled by a system of electromagnets situated at the base of the tube. For so high a scanning frequency, the bulk of the energy absorbed by these electromagnets is restored in the form of heat, this fairly quickly rendering them unsuitable for their role in the current state of mass-market technology. It is therefore necessary to reduce the line frequency.

The upper limit presently achieved is 3 H. We are therefore led to consider a standard based on a frame frequency of 75 Hz, with 625 lines per frame. The flicker effect is almost invisible at 75 Hz; the screens of certain workstations, for example, have a frame frequency of 72 Hz, this rendering them much less tiring to look at than a television screen.

The invention proposes a process for interpolating progressive frames from interlaced frames.

European Patent Applications 95 400722.5 (D94/128I) and 95 400721.7 (D941128I) in the name of Thomson Consumer Electronics SA describe processes and devices for converting images from a 50 Hz interlaced format to a 100 Hz interlaced format.

European Patent Application EP-A-064047 also in the name of Thomson Consumer Electronics relates to a method of measuring confidence in a motion estimate in an image conversion system.

SUMMARY OF THE INVENTION

The subject of the invention is a process for converting interlaced frames into progressive frames comprising a change of frame frequency by interpolation and motion compensation characterized in that when the motion vector associated with a pixel to be interpolated is non-zero or when this vector is zero, but the confidence accorded to this vector is less than a given threshold, the interpolation of a pixel of a frame situated temporally between two input frames is carried out by a median filtering pertaining to the values obtained by a first motion-compensated linear temporal filter, a second motion-compensated linear filter and a motion-compensated median temporal filter.

The filtering performed is made up of three basic filters, median and temporal, combined together by virtue of a median operator. This combination has several advantages:

The linear filters in themselves give correct results—whatever the contents of the image—in combination with the motion compensation; however, they give rise to a loss of resolution, the first median filter allows the output image to retain good resolution, the final median filter mollifies drawbacks connected with these three filters above by precluding the overly divergent values. Chiefly, the deviations of the first median filter are limited by the presence of the linear filters, which generally diverge little.

According to a particular embodiment, the confidence accorded to a vector is a linear function of the error engendered by this vector.

Evaluation of the confidence defined in this way makes it possible to use the motion compensation only insofar as the latter affords sufficiently reliable results.

According to a particular embodiment, the said linear filters are dependent on two pixels situated respectively in the input frames temporally surrounding the frame to be interpolated, the linear interpolation coefficients of each pixel corresponding to the ratio of the time intervals separating the frame to be interpolated and the preceding input frame and the following input frame respectively.

According to a particular embodiment, when the preceding input frame is odd, the said median temporal filter pertains to the following three pixels:

for the even lines of the frame to be interpolated, $$a = P\left[\begin{pmatrix} x \\ y-1 \end{pmatrix} + Front(i, j), \frac{1}{2}\right]$$

$$b = P\left[\begin{pmatrix} x \\ y \end{pmatrix} - Rear(i, j), 0\right]$$

$$c = P\left[\begin{pmatrix} x \\ y+1 \end{pmatrix} + Front(i, j), \frac{1}{2}\right]$$

then:

$P_2(x,y) = \text{med}(ma+(1-m)b; \text{med}(a,b,c); mc+(1-m)b)$ for the odd lines of the frame to be interpolated, $$a = P\left[\begin{pmatrix} x \\ y-1 \end{pmatrix} - Rear(i, j), 0\right]$$

$$b = P\left[\begin{pmatrix} x \\ y \end{pmatrix} + Front(i, j), \frac{1}{2}\right]$$

$$c = P\left[\begin{pmatrix} x \\ y+1 \end{pmatrix} - Rear(i, j), 0\right]$$

then:

$P_2(x,y) = \text{med}((1-m)a+mb; \text{med}(a,b,c); (1-m)c+mb))$ where Front(i,j) and Rear(i,j) are the fractions of the motion vector associated with the pixel to be interpolated, this vector being scaled and rounded, where "0" and "1/2" respectively represent the input frame preceding respectively following the frame to be interpolated, and where m represents an interpolation coefficient depending on the position of the frame to be interpolated between the input frames.

According to a particular embodiment, when the preceding input frame is odd, the said median temporal filter pertains to the following three pixels:

For the odd lines of the frame to be interpolated:

$$a = P\left[\begin{pmatrix} x \\ y-1 \end{pmatrix} + Front(i, j), 1\right]$$

$$b = P\left[\begin{pmatrix} x \\ y \end{pmatrix} - Rear(i, j), \frac{1}{2}\right]$$

$$c = P\left[\begin{pmatrix} x \\ y+1 \end{pmatrix} + Front(i, j), 1\right]$$

then:

$P_3(x,y) = \text{med}((1-n)a+b; \text{med}(a,b,c); (1-n)c+b)$

For the even lines of the frame to be interpolated:

$$a = P\left[\begin{pmatrix} x \\ y-1 \end{pmatrix} - Rear(i, j), \frac{1}{2}\right]$$

$$b = P\left[\begin{pmatrix} x \\ y \end{pmatrix} + Front(i, j), 1\right]$$

$$c = P\left[\begin{pmatrix} x \\ y+1 \end{pmatrix} - Rear(i, j), \frac{1}{2}\right]$$

then:

$P_3(x,y) = \text{med}(na+(1-n)b; \text{med}(a,b,c); nc+(1-n)b)$ where Front(i,j) and Rear(i,j) are the fractions of the motion vector associated with the pixel to be interpolated, this vector being scaled and rounded, where "1/2" and "1" respectively represent the input frame preceding respectively following the frame to be interpolated, and where n represents an interpolation coefficient depending on the position of the frame to be interpolated between the input frames.

According to a particular embodiment, the two pixels used for each linear filter are chosen from the group of three pixels used by the median temporal filter.

According to a particular embodiment, the interlaced frames emanate from progressive input images of frequency 25 Hz and the frequency of the output frames is 75 Hz, a first output frame being temporally merged with the second frame emanating from a first input image, a second output frame being temporally situated between the said first input frame and the first frame emanating from a second input image, a third output frame being temporally situated between the two input frames emanating from the said second input image, the interpolation coefficients used by the said temporal filters are 1/2 for the said second output frame.

The use of coefficients 1/2 makes it possible to obtain an appreciable reduction in jerks as compared with the use of coefficients 1/3 and 2/3 derived from the relative position of the second output frame between the first two input frames.

According to a particular embodiment, the pixels of the said third output frame are the pixels of the second input image.

In the particular case of the so-called "film mode" conversion, the third output frame in fact corresponds to the second input image. The latter will possibly have undergone the noise reductions mentioned in the description of the particular embodiment.

According to a particular embodiment, when the motion vector associated with a pixel to be interpolated is zero and the confidence in this vector exceeds a given threshold, then the value of the pixel to be interpolated is the final value obtained by median filtering between firstly the two pixel values obtained by subtracting, respectively adding the motion vector confidence referred to the pixel and divided by a corrective factor from/to the value of the pixel with the same position as the pixel to be interpolated in, as the case may be, the preceding input frame or the following input frame, and secondly a fallback value which results from a temporal and horizontal linear filtering on the pixels of the lines of the preceding and following input frames with identical position to the line containing the pixel to be interpolated, a vertical spatial filtering being performed if appropriate on the undefined lines of the input frames.

According to a particular embodiment, the fallback value is equal to:

$$Fallback(x, y) =$$

$$\frac{1}{16}(1\ 2\ 3\ 4\ 3\ 2\ 1)\left[m\begin{pmatrix}P(x-3,y,0)\\P(x-2,y,0)\\P(x-1,y,0)\\P(x,y,0)\\P(x+1,y,0)\\P(x+2,y,0)\\P(x+3,y,0)\end{pmatrix}+(1-m)\begin{pmatrix}P\left(x-3,y,\frac{1}{2}\right)\\P\left(x-2,y,\frac{1}{2}\right)\\P\left(x-1,y,\frac{1}{2}\right)\\P\left(x,y,\frac{1}{2}\right)\\P\left(x+1,y,\frac{1}{2}\right)\\P\left(x+2,y,\frac{1}{2}\right)\\P\left(x+3,y,\frac{1}{2}\right)\end{pmatrix}\right]$$

where "0" denotes the input frame preceding the frame to be interpolated and "1/2" the input frame following the frame to be interpolated, and here m represents a weighting coefficient depending on the temporal position of the frame to be interpolated between the input frames.

According to a particular embodiment, the interpolation of a pixel of a line of given parity of a frame whose lines of opposite parity are equal to the lines of an input frame is carried out, when the associated motion vector is not zero or the confidence accorded to this vector is low, through median filtering pertaining to the values obtained firstly by vertical linear filtering, secondly by vertical spatio-temporal median filtering on two pixels and motion-compensated on one pixel and thirdly by spatio-temporal median filtering pertaining to four pixels in a cross and motion-compensated on one pixel.

This type of two-level filtering has the same types of advantage as those presented in respect of the preceding filter. Furthermore, through the presence of median filters in a vertical direction and two diagonal directions, good restoration of the fine structures in these directions is ensured.

The influence of the pixels of the current input image is large: the majority of the pixels used belong to this image. This reduces the effect of motion estimation errors.

According to a particular embodiment, the said vertical linear filtering is as follows:

$$F1(x, y) = \frac{1}{2}\left(P\left[\begin{pmatrix}x\\y-1\end{pmatrix}, 0\right] + P\left[\begin{pmatrix}x\\y+1\end{pmatrix}, 0\right]\right)$$

where "0" represents the temporal position of the frame to be interpolated.

According to a particular embodiment, the said vertical spatio-temporal filtering on two pixels and motion-compensated on a pixel is:

$$F2(x, y) = \text{med}\left(P\left[\begin{pmatrix}x\\y-1\end{pmatrix}, 0\right]; P\left[\begin{pmatrix}x\\y+1\end{pmatrix}, 0\right]; P\left[\begin{pmatrix}x+v_x\\y+v_y\end{pmatrix}, \frac{1}{2}\right]\right)$$

where Vx and Vy are the coordinates of a motion vector associated with pixel to be interpolated, and where "0" represents the frame to be interpolated and "1/2" the following input frame.

According to a particular embodiment, the said spatio-temporal filtering pertaining to four pixels in a cross and to a motion-compensated pixel is:

$$F3(x, y) = \text{med}\left(P\left[\begin{pmatrix}x-1\\y-1\end{pmatrix}, 0\right]; P\left[\begin{pmatrix}x-1\\y+1\end{pmatrix}, 0\right];\right.$$
$$\left.P\left[\begin{pmatrix}x+1\\y-1\end{pmatrix}, 0\right]; P\left[\begin{pmatrix}x+1\\y+1\end{pmatrix}, 0\right]; P\left[\begin{pmatrix}x+v_x\\y+v_y\end{pmatrix}, \frac{1}{2}\right]\right)$$

According to a particular embodiment, when the motion vector associated with a pixel to be interpolated is zero and the confidence in this vector is greater than a given threshold, then the said pixel takes the value of the pixel with the same position in the following input frame.

BRIEF DESCRIPTION OF THE DRAWINGS

Other characteristics and advantages of the invention will emerge through the description of the non-limiting embodiment described in what follows and illustrated with the aid of the figures in which.

DETAILED DESCRIPTION OF THE INVENTION

Figure 1:
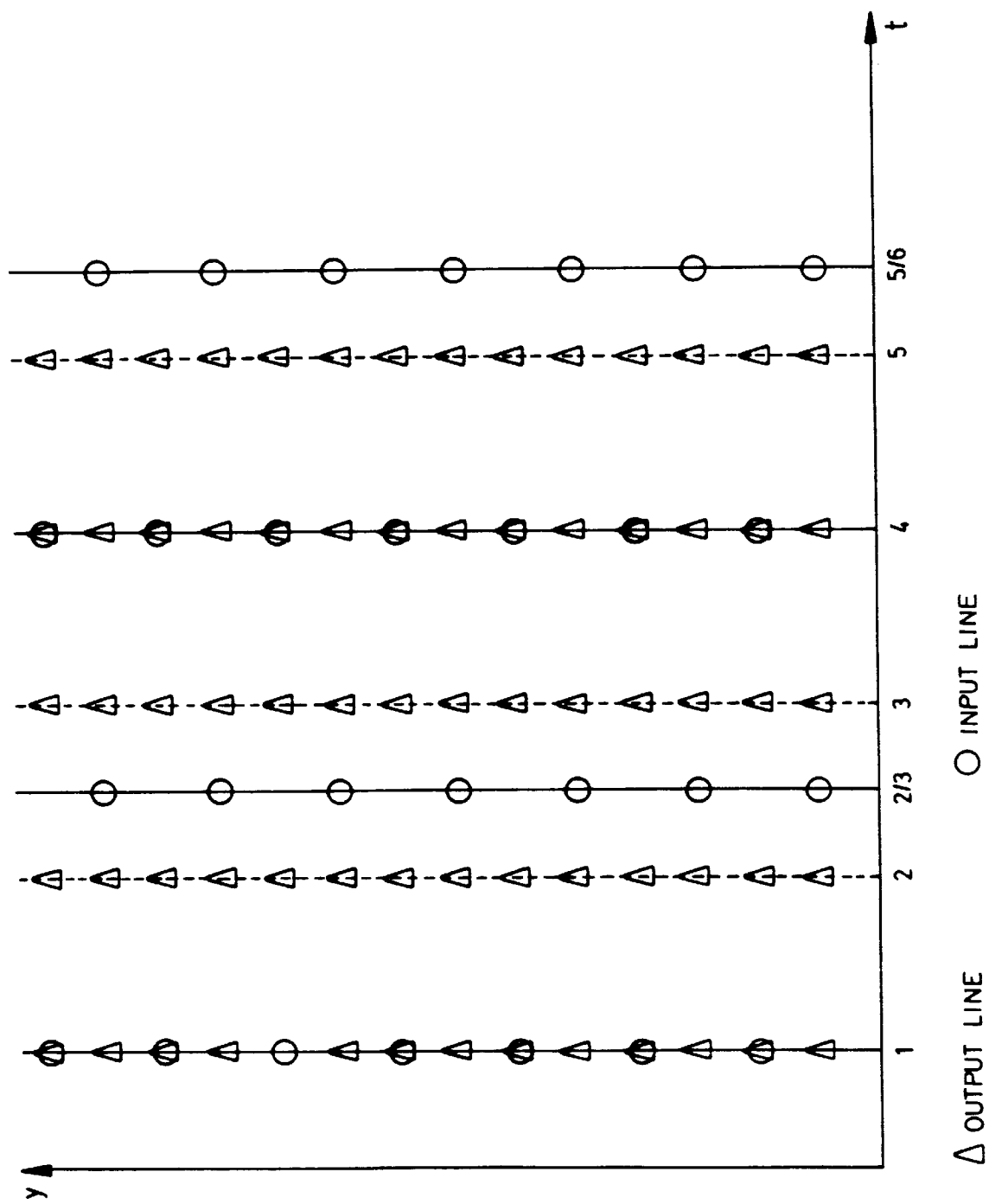
FIG. 1 is a diagram representing the input and output frames of the present process with respect to the time axis.

The invention will be explained in connection with a process for the frequency conversion of television images from 50 Hz interlaced to 75 Hz progressive.

Two patent applications filed jointly on the same day deal with other aspects of this process.

Conventions

A period is defined as being the time interval making it possible to display an output frame, namely 1/75 seconds. A cycle is defined as being the time interval required for a complete cycle of the algorithm, namely three periods or 1/25 seconds.

The process repeats itself identically every three output frames or every two input frames. By convention, the first output frame is numbered 1, the second is numbered 2, and so on. However, since the processing is cyclic, frames 1, 4, 7 . . . will be generated in an identical manner; they will be referred to as frames of type 1. Similarly, frames 2, 5, 8 . . . , respectively frames 3, 6, 9 . . . will be generated in an identical manner and respectively referred to as frames of type 2 and 3.

By convention, the input frames will be numbered by reference to the position which they occupy in relation to the output frames. Thus, an input frame corresponding temporally to an output frame will bear the same number as this output frame An input frame situated between two output frames will bear the numbers of these two frames: for example, an input frame situated between output frames 2 and 3 will be referred to as frame 2/3.

FIG. 1 illustrates the respective positions of the input and output frames.

Input frame number 1 includes the first line displayed on the screen of a television; it has been indexed line 0. This frame, hence the odd input frame, is formed of the lines 0, 2, 4, . . . , 624. An even frame 2/3, will contain lines 1, 3, 5, . . . , 623. The variable y will represent the line numbers, increasing from the top to the bottom of the screen, in the direction of the scan. The variable x will be used to denote the abscissa of a pixel and increases from left to right also in the direction of the scan. t will represent time, normalized such that one time unit represents a cycle. Frame 1 will be situated at time 0, frame 2/3 at time 1/2 and frame 4 at time 1.

The output frames will include all the line numbers, since these are progressive frames. The luminance signal at the position of a given pixel will be represented by the variable P(x,y,t).

General Layout

Advantageously, the conversion process described and the implementation device require only a single frame memory. This constraint is explained by the fact that the process is intended to be implemented in mass-produced appliances for the general public. The reduction in the cost of implementation from the hardware point of view is therefore an important factor.

Figure 2:
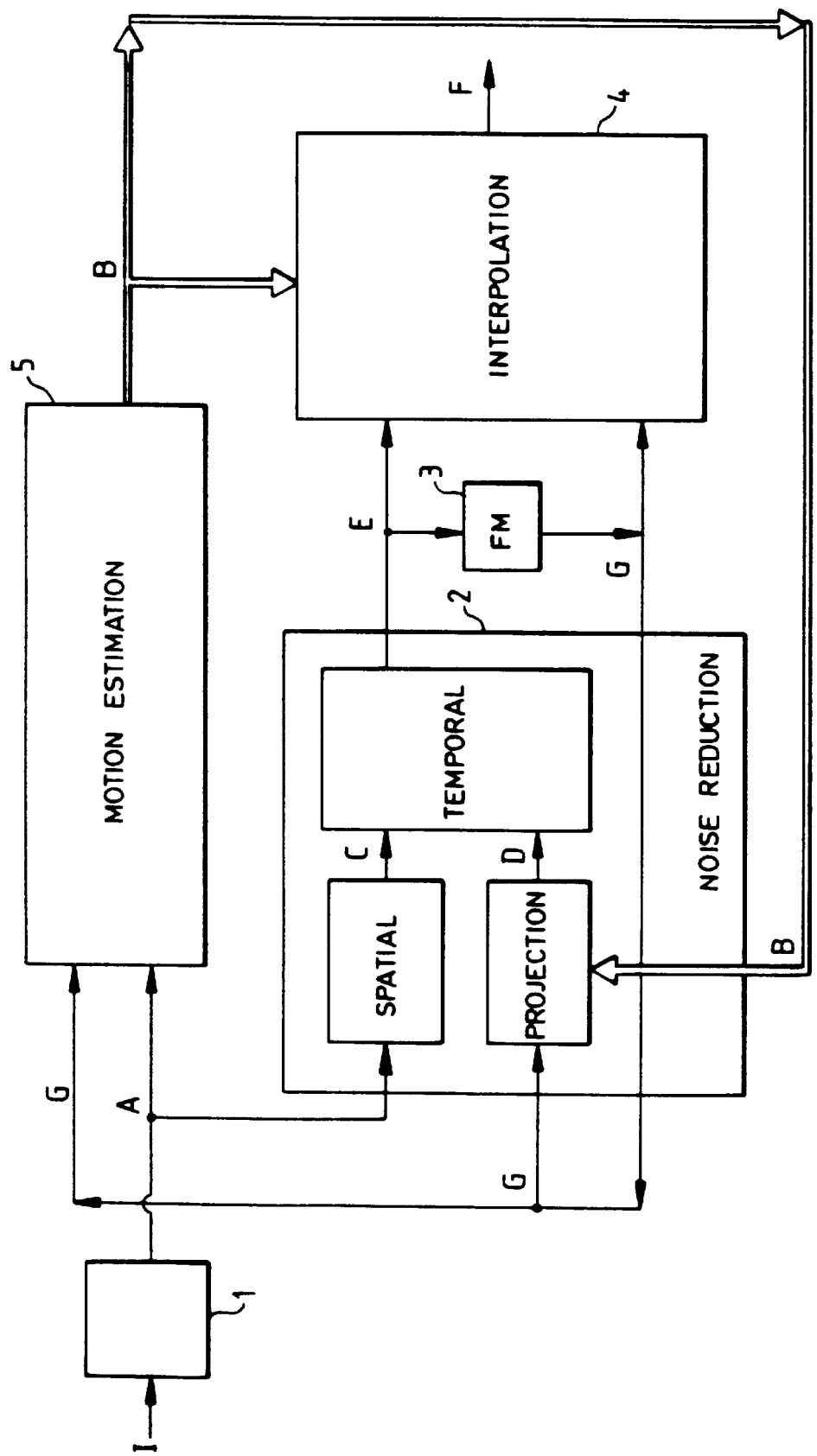
FIG. 2 is a block diagram of a device implementing the process in accordance with the present embodiment.

FIG. 2 is a block diagram of the device for implementing the invention. Each element will be seen in detail hereinbelow.

The device includes a random access memory 1 organized in FIFO mode and intended to increase the frequency of the frames from 50 to 75 Hz, by repeating every second frame in read mode. The memory 1 therefore receives frames at the frequency of 50 Hz as input and delivers frames at the frequency of 75 Hz.

The device furthermore includes a noise reduction circuit 2 comprising two filters: a spatial filter intended to reduce mainly noise of pulse type, and a recursive temporal filter. The spatial filter receives the frames output by the memory 1, then transmits the filtered frames to the temporal filter. The temporal filter also receives a frame termed the projected frame, made up of information from frames previously processed. The operation of the temporal filter will be seen in greater detail later.

A temporally filtered frame is stored in a frame memory 3 and transmitted to an interpolator 4. The interpolator 4 carries out the interpolation between two input frames so as to deliver the output frames from the device. The interpolator 4 receives motion vectors from a motion estimation circuit 5. Motion estimation is carried out between the frame stored in the frame memory 3 and the "current" frame read from the memory 1. A number of items of information relating to the motion estimation are used during noise reduction.

Figure 3:
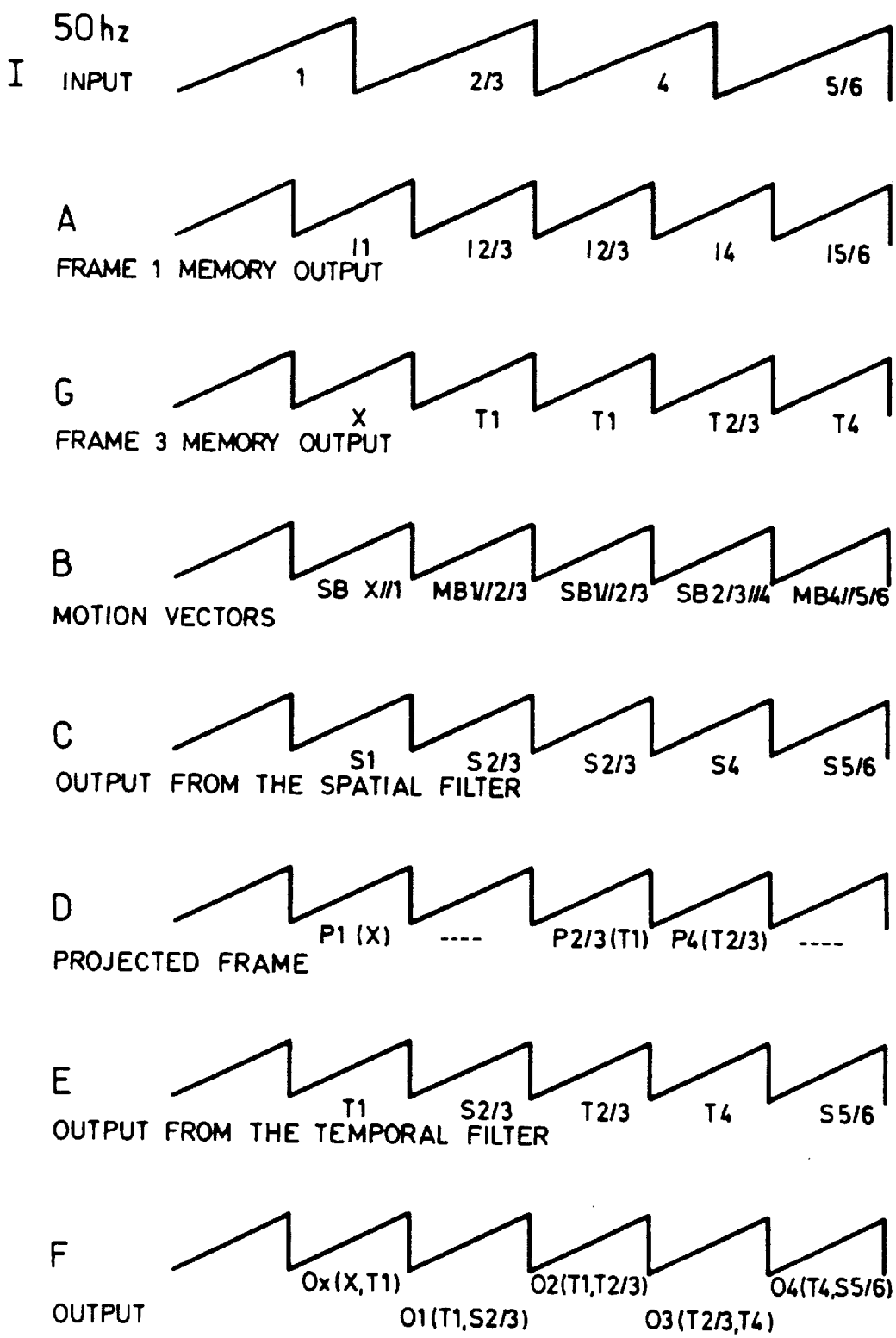
FIG. 3 represents a timechart of the frames at certain points of the device of FIG. 2.

FIG. 3 includes the timecharts relating to the frames processed by the various elements of the device of FIG. 2. The letters identifying each timechart correspond to the letters identifying the connections between the elements of this latter figure.

A frame is represented in the form of a sawtooth corresponding to the scanning of this frame.

The first timechart (I) corresponds to the input frames of memory 1, that is to say to the interlaced frames at 50 Hz. Frame 1 is odd, frame 2/3 is even etc . . . .

The second timechart (A) corresponds to the output from memory 1: the frames are reread at a rate of 75 Hz. Frame 1 (and frames 4, 7 . . . ) is read once, reading beginning even before writing has terminated. Frame 2/3 (and frames 5/6, 8/9 . . . ) is read twice.

The third timechart (G) represents the output from frame memory 3. This memory maintains a time gap of one frame between its input frame and that at its output, so that the interpolation can be effected correctly. For this purpose, the memory does not behave simply as a delay of one frame. If this were the case, the filtered frame 2/3 would be present both at the input of the memory and at its output. Hence, it is the filtered frame 1 which is repeated twice at the output of the frame memory.

The fourth timechart (B) represents the periods for calculating the information delivered by the motion estimator to the remainder of the device. As will be seen in greater detail hereinbelow, the motion estimator behaves differently in each period of a given cycle. For the frames of type 1, coarse motion vectors are calculated (reference "MB") for wide blocks (termed main blocks), whilst finer motion vectors are determined for the other two frames (reference "SB") for sub-blocks of the main blocks. Calculation of the vectors for the sub-blocks is based on the coarse vectors of the main blocks. The reference "MB1//2/3" of the timechart indicates for example the period for the "coarse" motion estimation between frame 1 and frame 2/3.

The fifth timechart (C) relates to the output from the spatial filter of the noise reduction circuit. This filtering is effected directly on the frame read from memory 1.

The sixth timechart (D) represents the projected frame compared by the noise reduction circuit with the spatially filtered frame.

The seventh timechart (E) indicates the output from the temporal filter and consequently the input to the interpolator 4 and to the frame memory 3. The final timechart indicates the output from the interpolator and therefore the output from the device itself.

Motion Estimator

The motion estimator works according to the process of hierarchical blockwise comparison. This process unfolds in two steps. It begins by dividing the image into coarse blocks or main blocks of 16*32 pixels whose motion is determined, and then these main blocks are divided into sub-blocks so as to refine the field of vectors.

Estimation is performed for the luminance signal, which generally contains sufficient information to describe the motion of objects on the screen. Of course, it is possible also to use the chrominance information or to combine the chrominance and luminance information for the estimation.

Before all else, the input frames are sub-sampled by a factor 2 in the horizontal and vertical directions. The calculations required for the estimation are thus divided by four. The sub-sampled frames will however be used only for the motion estimation. The interpolation of the output frames will be performed on the basis of the complete frames.

This sub-sampling naturally restricts the components of the motion vectors to even values. This is not detrimental in the vertical direction since this constraint is already imposed by the interlacing of the frames upon broadcasting.

During the sub-sampling only the odd lines and even columns will be retained. However, the points of the image will continue to be labelled with the aid of the coordinate system used hitherto, while precluding the pixels not belonging to the sub-sampled domain.

According to the present embodiment, before sub-sampling, a low-pass filter is applied to the frame, intended to suppress the high spatial frequencies which are the cause of spectral superposition. To do this, horizontally, use is made for example of a triangular window with seven coefficients:

$$Phorizontal(x, y, t) = \frac{1}{16}[1\ 2\ 3\ 4\ 3\ 2\ 1] \begin{bmatrix} P(x-3, y, t) \\ P(x-2, y, t) \\ P(x-1, y, t) \\ P(x, y, t) \\ P(x+1, y, t) \\ P(x+2, y, t) \\ P(x+3, y, t) \end{bmatrix}$$

Filtering is also undertaken in the vertical direction. Since only the odd lines are retained, this corresponds to the numbers of the vertically interpolated lines of the input frame 1 and to the numbers of the input lines of frame 2/3. In order to harmonize the spectral contents of the two sub-sampled input frames, low-pass filtering of input frame 2/3 is undertaken:

$$P \text{ sub-sampled}\left(x, y, \frac{1}{2}\right) = \frac{1}{4} \begin{bmatrix} Phorizontal\left(x, y-2, \frac{1}{2}\right) \\ +2Phorizontal\left(x, y, \frac{1}{2}\right) \\ +Phorizontal\left(x, y+2, \frac{1}{2}\right) \end{bmatrix}$$

For the frames of type 1, the odd lines are generated using a simple vertical average:

P sub-sampled(x,y,0)=1/2[Phorizontal(x,y−1,0)+ Phorizontal(x,y+1,0)]

Figure 7:
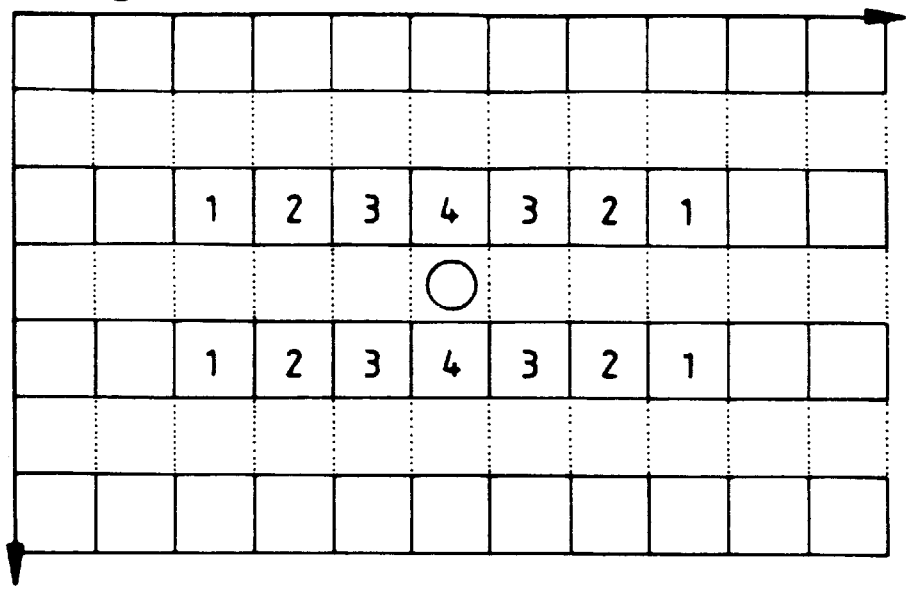
FIG. 7 represents two low-pass filters.
Figure 7:
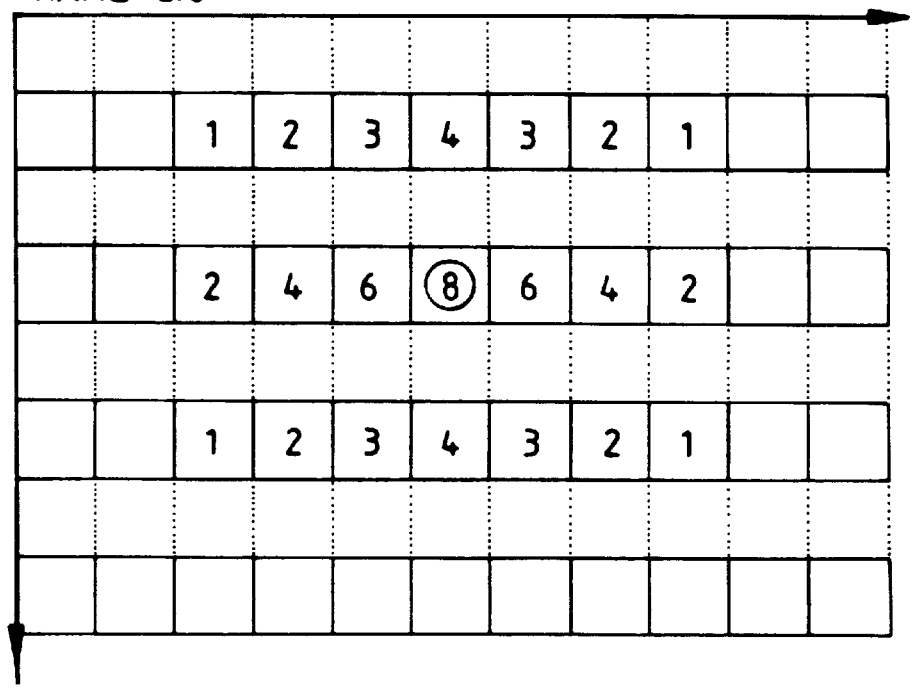

The functions P sub-sampled(x,y,0) and P sub-sampled (x,y,1/2) are defined only for x even and y odd. For simplicity, the sub-sampled frames will be denoted P'(x,y,t). The filters used are represented in FIG. 7.

As has already been mentioned, the hierarchical estimation process behaves differently during the three periods of a cycle:

during period 1, the vectors are calculated which correspond to the main blocks, representative of the motion between frames 1 and 2/3, during period 2, the vectors are calculated which correspond to the sub-blocks, more accurately representative of the motion between frames 1 and 2/3, the calculation being done with the aid of the vectors determined during period 1, during period 3, the vectors are calculated which correspond to the sub-blocks, representative of the motion between frames 2/3 and 4. In the latter case, the calculation is done on the basis of vectors of intermediate blocks, which consist of refreshed values of the vectors corresponding to the main blocks.

Determination of the Coarse Vector Field Between Frames 1 and 2/3

The image is firstly partitioned into main blocks of 32*16 pixels. Since the size of an active image is 720*576 pixels for the standard sampling frequency, there are thus 23 main blocks per line and 36 per column.

For a main block indexed (i,j) with i between 0 and 22 and j between 0 and 35 and belonging by definition to the incoming frame (temporally most recent frame), hence a frame 2/3 or equivalent, the error incurred in respect of a motion vector (u,v) is defined by:

$$E_{(i,j)}(u, v) = \sum_{\substack{k=0,2,4,\ldots,30 \\ l=0,2,\ldots,14}} \left| P'\left[\begin{pmatrix} M_x * i + k \\ M_y * j + l \end{pmatrix}, t\right] - P'\left[\begin{pmatrix} M_x * i - u \\ M_y * j - v \end{pmatrix}, t - 1/2\right] \right|$$

with Mx=32, the size along the abscissa of a main block, and My=16, the size along the ordinate of a main block.

The error matrix is then calculated for each main block: each element of this matrix corresponds to an error linked with a possible motion vector, i.e.:

Err(i,j)=(E(i,j)(u,v)) for u=−16,−14, . . . , 14, 16;v=−4,−2,0,2,4

The components of the motion vectors are even and lie respectively between −16 and +16, and −4 and +4. The relevant main block is therefore compared with blocks of a search window of a previous frame, this search window being situated around the position of the main block as referred to this previous frame. The vector picked from the set of vectors is denoted by (u',v') and corresponds to the minimum of the error function.

Errmin=min(E(i,j)(u,v))=Err(i,j)(u',v')

for u=−16,−14, . . . , 14, 16 and v=−4,−2,0,2,4

The vector field of the complete image is calculated by scanning, block by block, and by applying this search to each main block.

Furthermore, an estimate of the noise of the image is undertaken when calculating the vector field at main block level. To do this, an extra value is calculated: the maximum error of the matrix:

Errmax=max($E_{(i,j)}$(u,v))

for u=−16,−14, . . . , 14, 16;v=−4,−2,0,2,4

Errmin represents an estimate of the sum of two sources of noise: the noise inherent in the luminance signal, and the motion vector quantization noise. Indeed, if the motion vector calculated corresponds closely to the motion actually present in the image, Errmin will be the sum of the differences in luminosity existing in two identical surfaces having the size of a main block: these differences will therefore originate solely from the noise of the image.

On the other hand, if owing to the quantization of the possible vectors, the motion is poorly represented by the calculated vector, then a component due to the error made in this vector will be added to the previous noise: Errmin will be too severe to define the actual noise of the image.

Consequently a second estimator is defined, namely Errmax−Errmin. This also depends on the image quantization noise. Over a uniform region, the difference between the maximum error and the minimum error arises solely from the noise of the image. If the quantization noise is high, then Errmin and Errmax are both affected; this estimator can be expected to be less sensitive to the quantization noise eliminated by differencing.

Moreover, two estimators Errminabs and Noiseest are defined:

$$Errminabs = \min_{\substack{i=0,\ldots,22 \\ j=0,\ldots,35}} \{Errmin(i,j), (Errmax - Errmin)(i,j)\}$$

$$Noiseest = \min_{i,j}\{Errmin(i,j)\}$$

Corrections Made to the Calculations of Period 1

According to a variant embodiment, a first correction is made when the image contains uniform regions.

Over a uniform region, such as a patch of blue sky, the error matrix is approximately constant. The fluctuations are due to the presence of noise in the image. The vector calculated by way of the process according to the invention is therefore unpredictable and this may result in strong heterogeneity of the vector field, this being prejudicial to the rest of the process. In the presence of such heterogeneities, the corresponding vector will be set to zero.

This setting is in fact carried out component by component. Thus, considering a horizontal boundary in the image (a cliff surmounted by blue sky for example), the u component of the motion vector is not fixed since the errors are constant over each row of the matrix. This component is therefore set to zero. Similarly for the component v in the case of a vertical boundary.

According to the present example embodiment, the criterion employed to determine whether a vector component should be set to zero is linked with the noise level calculated hereinabove.

If Err(i,j)(0,v)−Err(i,j)(u,v)<Errminabs*threshold_x then u=0

If Err(i,j)(u,0)−Err(i,j)(u,v)<Errminabs*threshold_y then v=0 with Errminabs=min{Errmin(i,j),(Errmax−Errmin)(i,j)}
i=0, . . . ,22
j=0, . . . ,35

The values threshold_x and threshold_y are for example equal to multiples of 2: 2, 4, 8 . . . .

Plainly, if the difference between the errors engendered by the vector with zero component and the vector found by the motion estimation is of the same order of magnitude as the estimated noise inherent in the image, then the correction is made.

According to the present example embodiment of the invention, a correction is made when the image contains periodic structures.

The problem posed by this kind of structure has already been outlined in the introduction. It can however be specified with the help of FIGS. 4 and 12 for a better understanding of the envisaged detection and correction.

Figure 4:
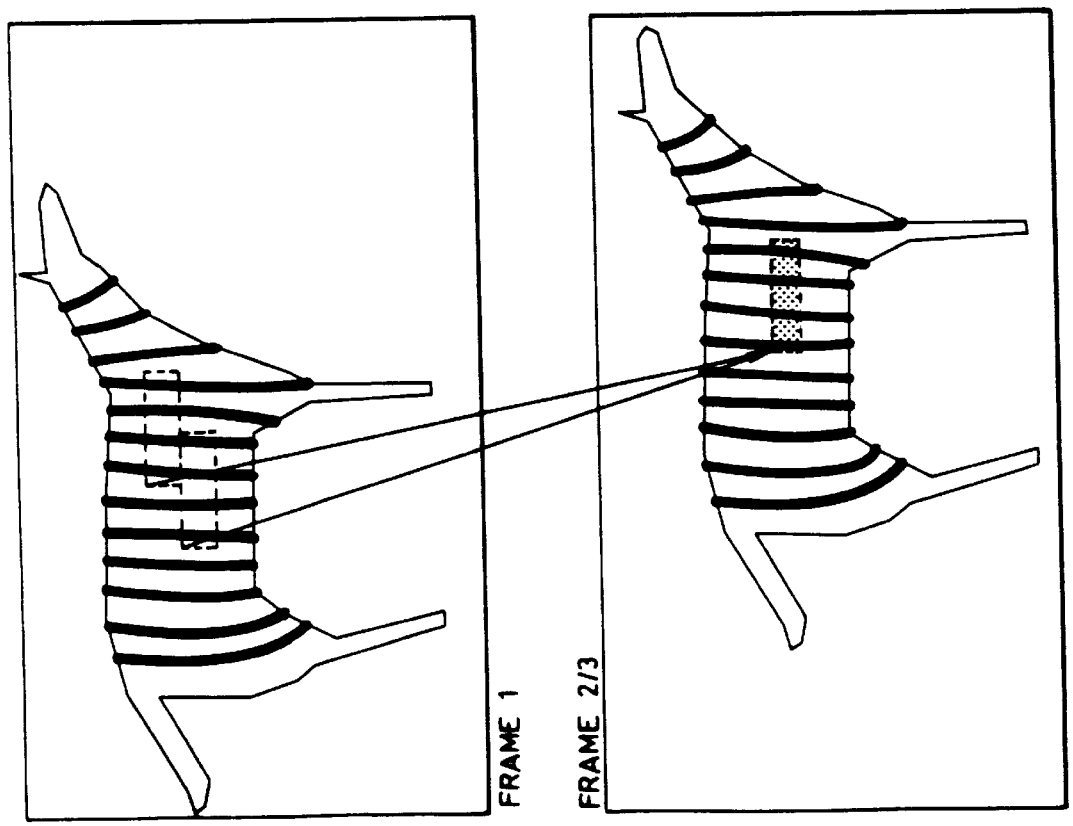
FIG. 4 represents an image containing periodic structures, as well as an example of motion vectors which can be generated in respect of such an image.

The shaded block in FIG. 4 represents the block whose motion is to be determined, whilst the two dashed blocks represent two blocks in the reference image giving rise to an error minimum in the error matrix. An incorrect vector will generate very perceptible defects during the interpolation of the output frames.

Figure 12:
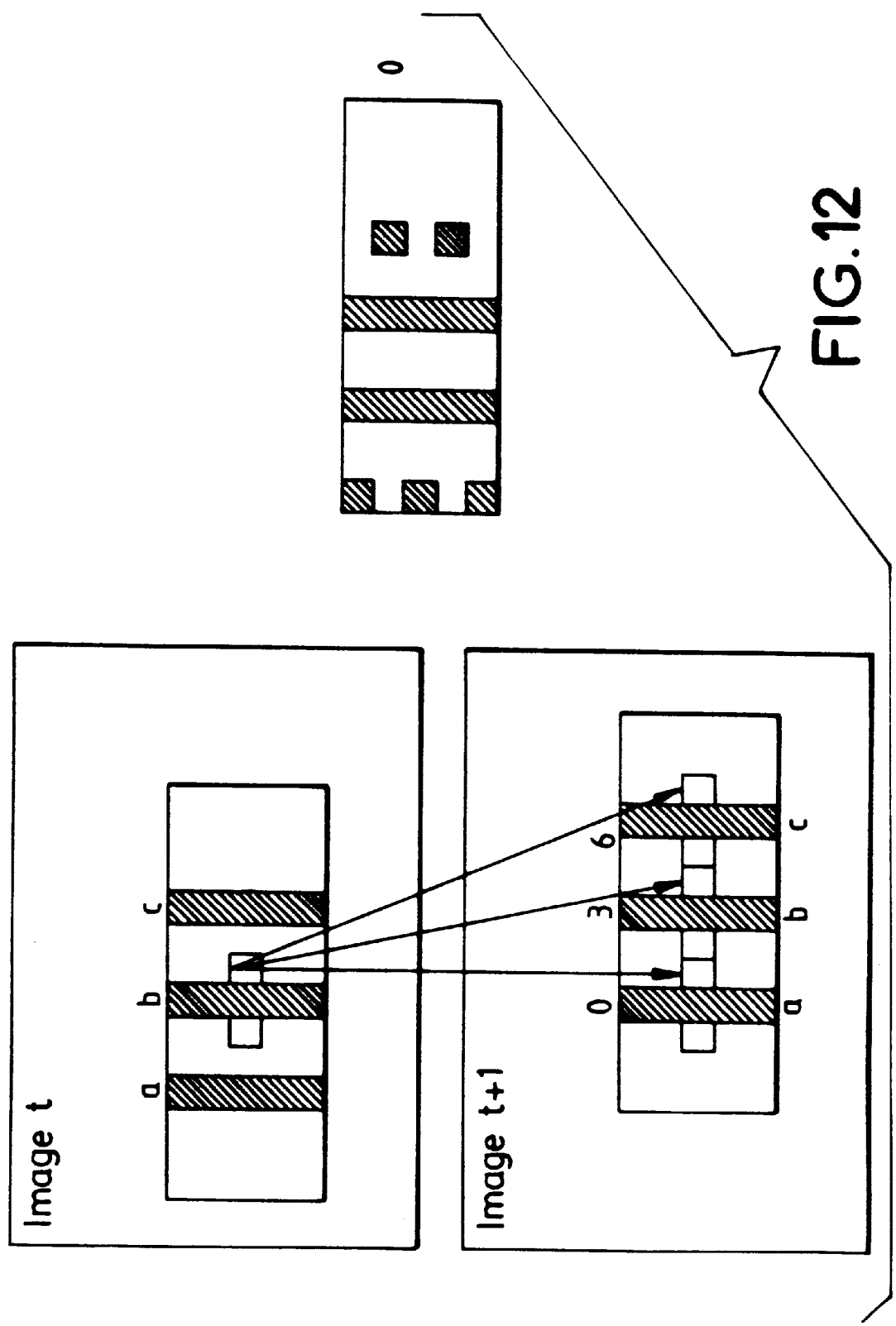
FIG. 12 illustrates a problem linked with the presence of periodic structures in the image.

These defects are illustrated in close-up in FIG. 12, where the true motion of a block between two frames of opposite parity is given by a vector having a horizontal component +2. If the motion vector is zero, then the defects illustrated in the right-hand part of the figure appear during interlacing. The height of the lines has been exaggerated in order to show the defects clearly.

Within the context of the present example embodiment, attention will be restricted to horizontal periodicity (for example a zebra with vertical stripes), given that the size of the main blocks and the range of any vertical components of the motion vectors make this type of error improbable in the vertical direction. The range of the vertical components is too restricted to allow detection or effective correction. Nevertheless, those skilled in the art will readily be able to adapt the correction described hereinbelow to, in particular, vertical periodicity.

Two steps will now be outlined: detection and then correction of this type of error.

Detection of this type of defect is performed on the basis of the error matrix Err. Thus, the row containing the minimum of the elements of the matrix will also contain one or more secondary minima as explained above.

Firstly, the row (Row(u)) of the errors containing the minimum is extracted from the matrix, with −16<=u<=+16. Let umin be the index of the minimum in Row(u). We start by detecting the secondary minimum. It is characterized as being a local minimum:

Row(u−1)>Row(u) and Row(u+1)>Row(u)

Only the smallest of the secondary minima meeting this criterion is picked. Let Usec_min be its index in the raw Row(u). Next, the secondary maximum, situated between the positions umin and usec_min, is detected. It is characterized as being a local maximum:

Row(u−1)<Row(u) and Row(u+1)<Row(u)

Only the largest of the secondary maxima meeting this criterion is picked. Let usec_max be its index in Row(u).

Figure 5:
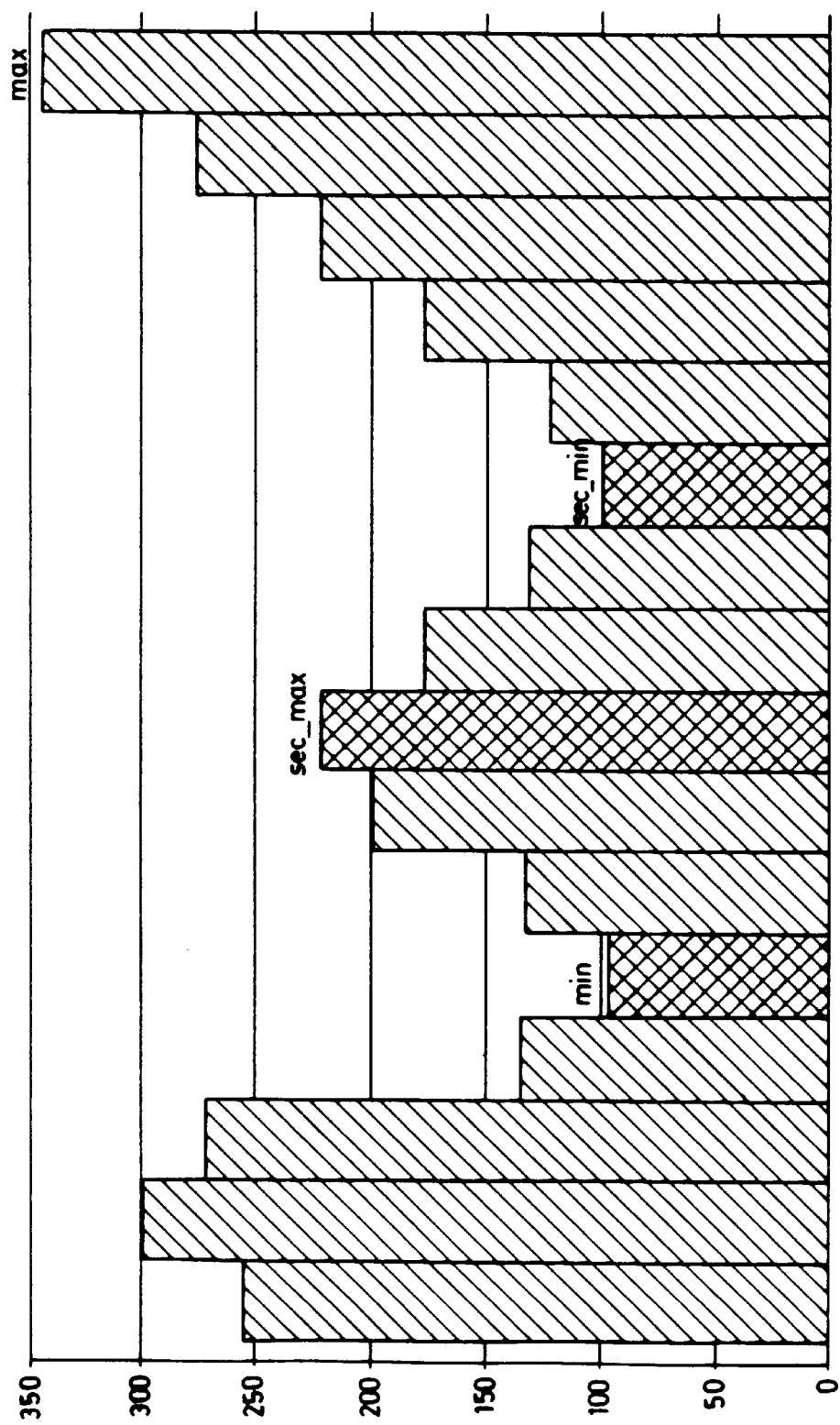
FIG. 5 represents a histogram of the errors of a row of an error matrix linked with a given vertical component of a motion vector and containing the smallest error in the matrix.

The histogram of FIG. 5 represents an example characteristic of such a situation.

The secondary minimum and the absolute minimum, together with the secondary maximum are subjected to two further tests to confirm the presence of a periodic structure:

the two minima should be close in value (C1), the difference between them and the secondary maximum should be significant relative to the current noise level (C2).

These precautions should be taken so as to prevent a main block at the edge of the zebra being regarded as periodic. Thus, a main block may straddle the edge of the zebra, one half belonging to the animal and the other to the grassland. This block may give an error minimum, which will however be greater than the minima linked with a periodicity. This will also prevent a noise-affected error matrix from being regarded as periodic.

We write:

Errmin=Row(umin)

Errmax=Row(umax)

Err_sec_min=Row(usec_min)

Err_sec_max=Row(usec_max)

We impose the following conditions:

(C1) Err_sec_min−Errmin<a*Errmax (C2) Err_sec_max−Err_sec_min>b*Errminabs (C3) Errmax>c*Errminabs According to the present example, we take a=0.5
b=2
c=4

An error row satisfying all the conditions will arise from a matrix associated with a block which is likely to contain a periodic structure.

According to a variant embodiment, the first two conditions alone are combined.

The vector associated with this main block then has to be corrected.

Figure 6:
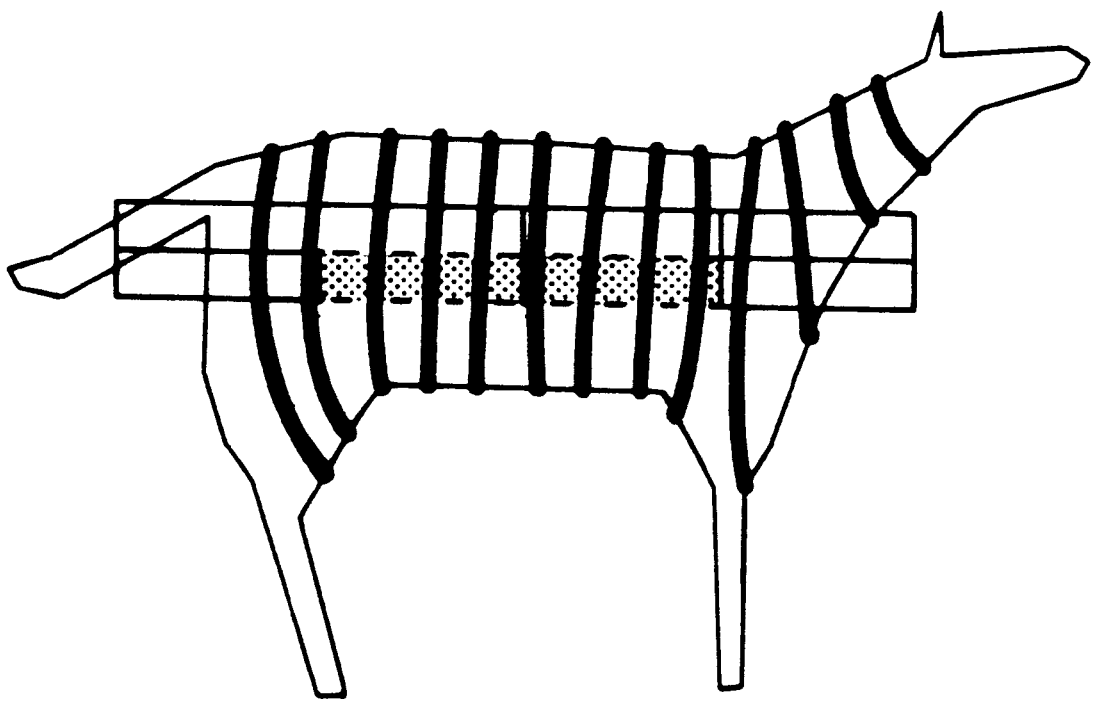
FIG. 6 illustrates the process employed in order to take into account periodic blocks when determining the motion vector field of an image.

To do this, it is not sufficient to consider the periodic main block alone. Referring back to the drawing of the zebra, on disregarding the whole of that part of the animal which is not contained in the main block, a rectangle with vertical stripes is obtained. On searching for that part of the previous image to which this rectangle corresponds, several possible striped rectangles will be found without it being possible to decide which one should be considered. In order to make this choice the main block is gradually enlarged in order to remove the uncertainty. The process is illustrated by FIG. 6 in which the shaded blocks are the periodic blocks of a line of the image.

In a given line the detection of a periodic main block will indicate that an entire region of the image has been found containing a periodic structure. The motion vector of this main block will not be picked immediately; instead, the error matrix corresponding to this block will be stored.

We pass on to the next main block on the same line. If this also is periodic its error matrix is again stored. Ultimately the end of the periodic structure is reached, in this instance the right-hand edge of the zebra.

Let (i1,J1) be the coordinates of the first periodic main block encountered, and (i2,J1) those of the last. Member by member aggregation of all the stored matrices is undertaken. A matrix is obtained whose components will be equal to:

for all u∈[−16,−14, ..., 14, 16] and for all V∈[−4, ...,4]
Sum(u,v)=ΣErr(i,j)(u,v)
i=i1,i2
j=j1

The same error matrix would have been obtained if the basic algorithm had been applied to a main block of width (i2−i1+1) times the width of a single main block. The error matrix obviously has the same size.

This matrix is still not sufficient to determine the correct motion vector. The blocks at the start and end of the periodic structure must be considered. Thus, these blocks generally contain the edge of the periodic region in motion and therefore make it possible to remove the ambiguity in the information contained in the error matrix.

After having determined the above matrix, the following is carried out:

the vectors of the two main blocks at the start and end of the periodic structure are considered. For each, the corresponding error is extracted from the matrix Sum. The vector with the smallest error will be picked, if this vector does not correspond to a local minimum of its row of the error matrix Sum, the minimum of the error matrix is selected and the corresponding vector is picked, finally, to obtain vertical consistency between adjacent periodic blocks, a test is carried out as to whether one of the blocks immediately above this line of periodic blocks is also periodic and if so its vector is picked provided however that it does indeed correspond to a minimum in the row of the error matrix.

The vector picked will thus be the vector used for the set of blocks of the periodic structure.

After having determined the vectors and possibly the first and or the second correction, a vector field is obtained denoted:

$\vec{MB}(i,j)$ with $0 \leq i \leq 22$ and $0 \leq j \leq 35$

Refining of the Spatial Resolution of the Vector Field

This phase of the process is used twice in succession during periods 2 and 3.

It involves attempting to characterize the motion more finely by allocating vectors to smaller elements: the sub-blocks (which, according to the present example, have a size of 4*4 pixels). This will make it possible to obtain a better fit of the vector field to the edges of moving objects.

According to the present example, there are 180 sub-blocks in one image width and 144 sub-blocks heightwise.

In accordance with the present example embodiment, the set of errors associated with the complete range of possible motion vectors is not recalculated as was done for the main blocks. For each sub-block, candidate vectors are chosen from among the vectors of the main blocks and the error generated by each of these candidate vectors is determined.

In the context of the present example, the candidate vectors for a sub-block are the vectors of the four main blocks closest to this sub-block. The vector giving rise to the smallest error will be allocated to the sub-block.

The use of candidate vectors associated with main blocks adjacent to the block containing the sub-block considered makes it possible accurately to determine the edges of moving objects, and consequently the boundaries of the regions of uniform motion: if the edge of an object in motion intrudes slightly into a main block, the vector found in respect of the latter will be a vector indicating the background and not the object in motion, because the larger part of the pixels of this main block belong to this background, the motion of which may differ from that of the object. Consequently, the edge of the object will not be reconstructed correctly.

On the other hand, if in respect of the sub-blocks of the edge of the object, the vectors of the adjacent main blocks are also considered, the motion of these sub-blocks will be correctly estimated since at least one of the adjacent main blocks will form part of the object in question.

Frame 2

We seek to determine the vector field which minimizes the difference of the luminances of the sub-blocks between frames 1 and 2/3. However, it is the output frame 2 which ultimately will be displayed. To improve the accuracy the sub-blocks are consequently regarded as forming part of this frame 2.

Figure 8:
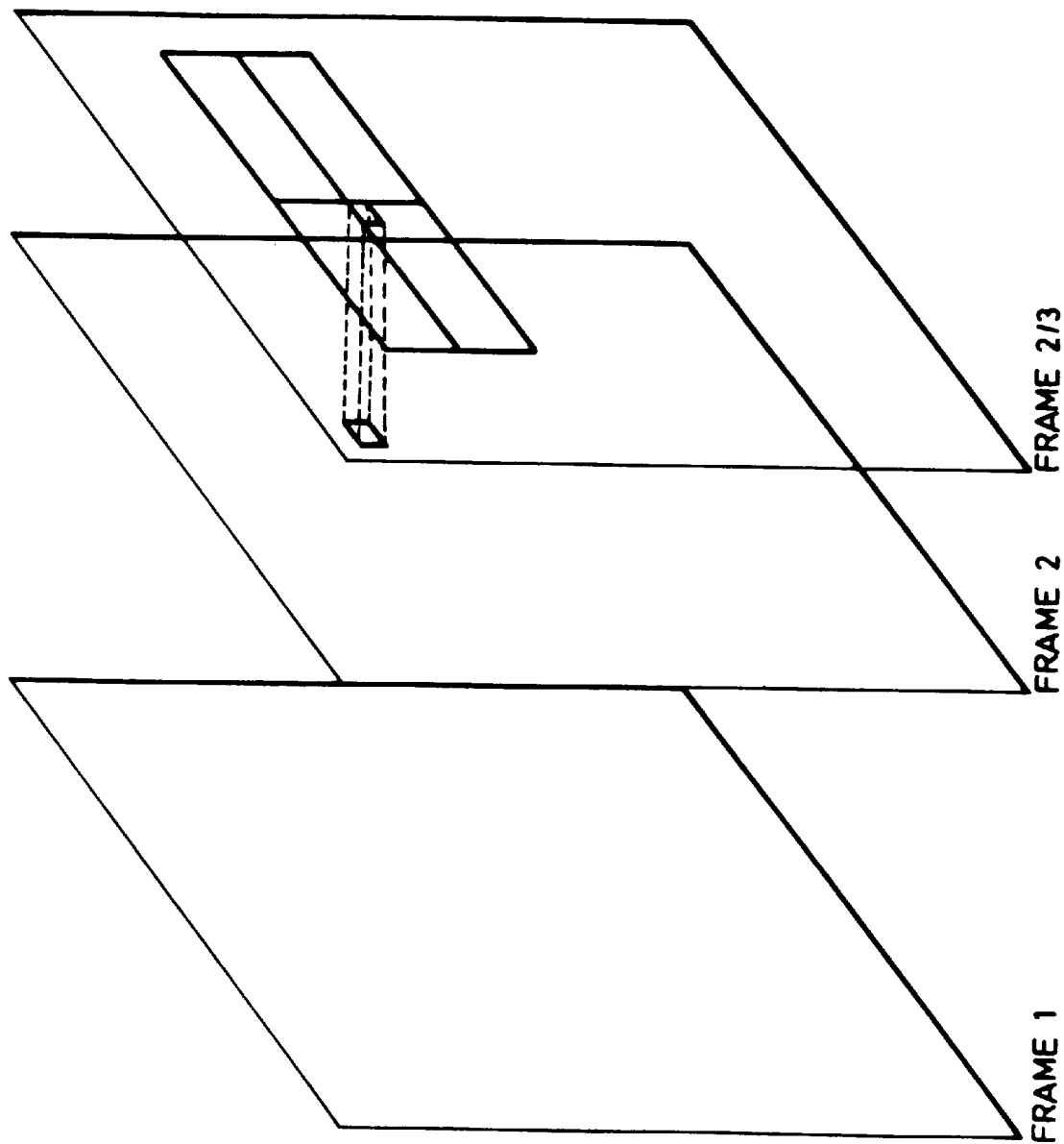
FIG. 8 represents frames 1, 2 and 2/3 and the position of a sub-block with respect to the main blocks whose vectors are selected as candidate vectors for the sub-block.
Figure 9:
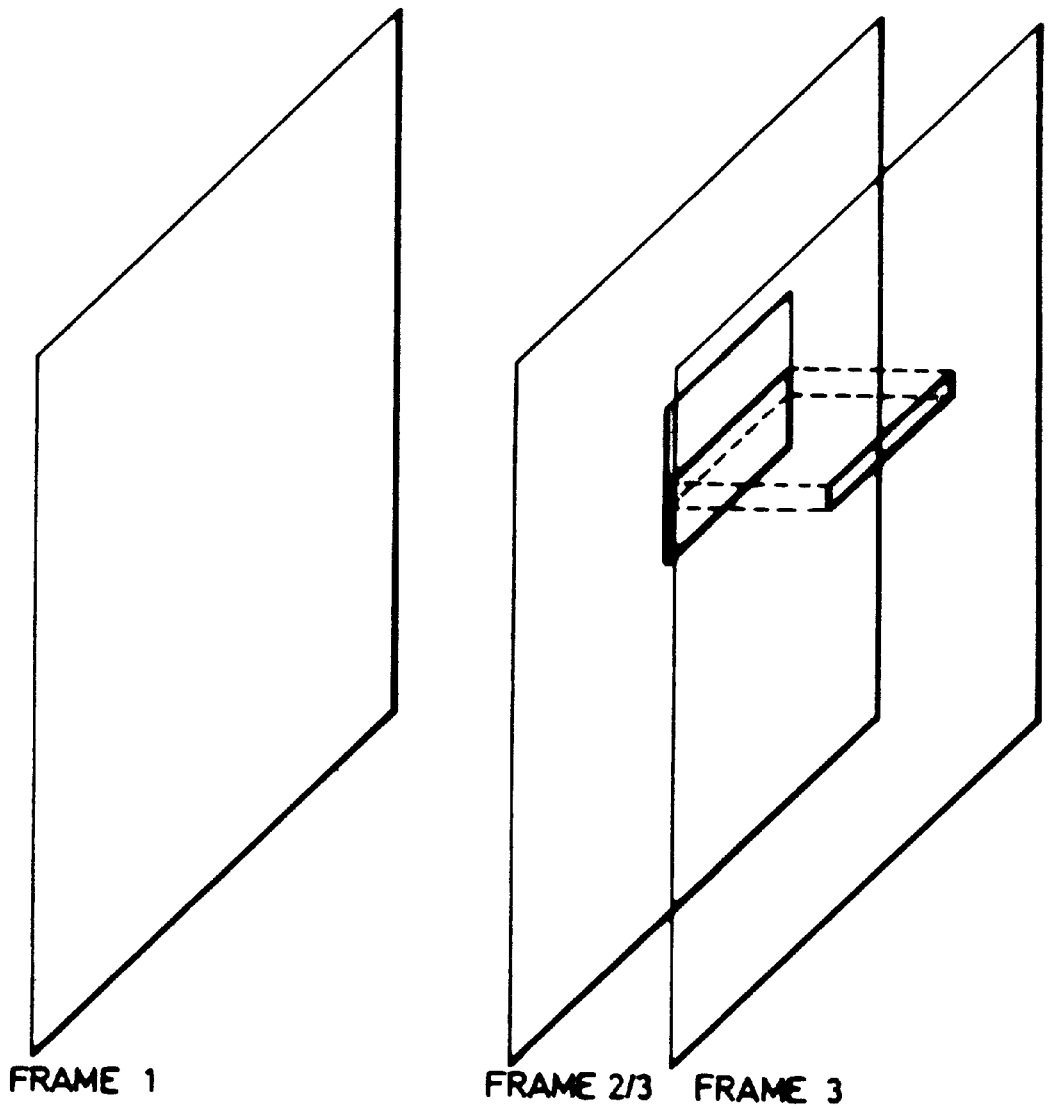
FIG. 9 represents frames 1, 2/3 and 3 and the position of an intermediate block with respect to the main blocks whose vectors are used as candidate vectors.

For each sub-block of frame 2 four adjacent main blocks are determined as follows: the sub-block is projected orthogonally onto frame 2/3 (see FIG. 8). The four closest blocks will then be chosen as follows:

When discussing sub-block (i,j) (0<i<180, 0<j<144), it will then be said that the 4 relevant main blocks are:

If imod8<4 then i'=−1 else i'=1
If jmod4<2 then j'=−1 else j'=1
$Rel_{(i,j)}(1)=MB(i \vee 8, j \vee 4)$
$Rel_{(i,j)}(2)=MB(i \vee 8+i', j \vee 4)$
$Rel_{(i,j)}(3)=MB(i \vee 8, j \vee 4+j')$
$Rel_{(i,j)}(4)=MB(i \vee 8+i', j \vee 4+j')$ where the quotient of the euclidian division of a by b is denoted a∨b and its remainder amodb.

Once the candidate vectors have been chosen they must be compared. As indicated above, the sub-block forms part of the frame displayed. The vector of the main block in question is therefore scaled. We begin by calculating the 2/3s and the result is rounded. We thus obtain the vector of motion between frame 1 and frame 2. The remaining vector corresponds to the motion between frame 2 and frame 2/3. If these two vectors are referred to as the rear vector and front vector respectively, we have:

For m=1,2,3

$Rear_{(i,j)}(m) = int(2/3 \cdot Rel_{(i,j)}(m))$ $Front_{(i,j)}(m) = Rel_{(i,j)}(m) - Rear_{(i,j)}(m)$ We next calculate the four errors associated with these four vectors:

For m=1,2,3,4

$$Err_{(i,j)}(m) = \sum_{\substack{k=0,2 \\ l=0,2}} \left| P'\left[\begin{pmatrix} S_x \cdot i + k \\ S_y \cdot j + l \end{pmatrix} + Front_{(i,j)}(m), \frac{1}{2}\right] - P'\left[\begin{pmatrix} S_x \cdot i + k \\ S_y \cdot j + l \end{pmatrix} - Rear_{(i,j)}(m), 0\right] \right|$$

where Sx and Sy represent the sizes in pixels along the abscissa and along the ordinate of a subblock.

The vector of the sub-block will be the vector having a minimum error. A vector field denoted Raw(i,j) is obtained by scanning all the sub-blocks.

According to a variant embodiment, the components of the vectors of this field are subjected to median filtering in order to eliminate the outlier values: thus, a small error in a sub-block is less visible than a local heterogeneity of the vector field.

Let:

$a = (1\ 0) \cdot Raw_{(i-1,j)}$;  $a' = (0\ 1) \cdot Raw_{(i-1,j)}$ $b = (1\ 0) \cdot Raw_{(i,j)}$;  $b' = (0\ 1) \cdot Raw_{(i,j)}$ $c = (1\ 0) \cdot Raw_{(i+1,j)}$;  $c' = (0\ 1) \cdot Raw_{(i+1,j)}$ The vector field can then be written $$SB_2(i, j) = \begin{pmatrix} med(a, b, c) \\ med(a', b', c') \end{pmatrix}.$$

The median filtering is therefore carried out, for a given sub-block, by considering the vector calculated previously for this sub-block and the vectors of the horizontally adjacent sub-blocks.

A vector field is therefore obtained for sub-blocks of 4*4 pixels.

The error associated with the chosen vector is also defined for each sub-block. This error is a measure of the confidence accorded to each motion vector. The error can be written:

$Err_2(i, j) =$ $$\sum_{\substack{k=0,1,2,3 \\ l=0,2}} \left| P'\left[\begin{pmatrix} S_x \cdot i + k \\ S_y \cdot j + l \end{pmatrix} + Front(i, j), \frac{1}{2}\right] - P'\left[\begin{pmatrix} S_x \cdot i + k \\ S_y \cdot j + l \end{pmatrix} - Rear(i, j), 0\right] \right|$$

Frame 3

As was done for frame 2, a calculation of vectors at sub-block level is undertaken for frame 3, by estimating the motion between frames 2/3 and 4. However, the calculation differs from that employed previously. Thus, according to the present example embodiment, for reasons of economy of delay lines, motion vectors are not calculated for main blocks between frames 2/3 and 4. Indeed, were it necessary in respect of frame 3 to calculate the vectors of the main blocks and also those of the adjacent sub-blocks, it would be necessary, in respect of a given sub-block, to have calculated the vectors of all the adjacent main block, thereby introducing a delay corresponding approximately to the number of lines contained in a row of main blocks.

The vectors of the sub-blocks for frame 3 will be calculated from the vector field previously calculated for the main blocks between frames 1 and 2/3. This poses problems in the case of fast motion, given that the vectors of the sub-blocks will then be calculated from vectors which no longer reflect the actual motion.

According to the present example embodiment, the information relating to the main blocks is refreshed by creating a vector field for blocks referred to as intermediate blocks, whose size is, precisely, intermediate between that of a main block and that of a sub-block.

According to the present example embodiment, the intermediate blocks have a size of 32 pixels by 4 lines: their width is that of a main block and their height that of a sub-block. The vector field with mean spatial resolution, associated with these intermediate blocks, is calculated on the basis of frames 2/3 and 4 of the vector field of the main blocks, determined for frames 1 and 2/3. Secondly the vector field of the sub-blocks will be deduced from this. It can be seen that if the vector field determined between frames 1 and 2/3 is taken as the source of candidate vectors, the error calculations will nevertheless be performed on the basis of the information from frames 2/3 and 4.

In the same way as for the sub-blocks of frame 2, the calculations are considered to be performed for intermediate blocks belonging to the output frame, namely frame 3. As before, there will be reason to split the motion vectors to be applied to the intermediate blocks into two vectors. Thus, for a vector (u,v), two vectors Front and Rear will be determined as follows:

Front=2/3(u,v)

Rear=(u,v)−Front

The error associated with the motion vector (u,v) for an intermediate block (i,j) may be written:

$$Err_{Intermediate}(i, j) = \sum_{\substack{k=0,2,\ldots,30 \\ l=0,2}} \left| P'\left[\begin{pmatrix} M_x \cdot i + k \\ S_y \cdot j + l \end{pmatrix} + Front(i, j), \frac{1}{2}\right] - P'\left[\begin{pmatrix} M_x \cdot i + k \\ S_y \cdot j + l \end{pmatrix} - Rear(i, j), 1\right] \right|$$

For a given intermediate block of frame 3, the main block corresponding thereto is determined: this is the main block which, projected orthogonally onto frame 3, contains this intermediate block.

A number of candidate vectors is determined for a given intermediate block (i,j):

the vector of the corresponding main block, the vector deduced from the vector of the main block hereinabove by modifying its horizontal component by one quantization step in the positive direction, the vector deduced from the main block hereinabove by modifying its horizontal component by one quantization step in the negative direction, the vector of the main block closest (above or below) to the intermediate block, the vector deduced from the main block hereinabove by modifying its horizontal component by one quantization step in the positive direction, the vector deduced from the main block hereinabove by modifying its horizontal component by one quantization step in the negative direction, According to the present example embodiment, the six candidate vectors will therefore be:

If jmod4<2 then j'=−1 else j'=1

$$Rel^{IB}(i,j)(1) = MB(i, j \vee 4)$$

$$Rel^{IB}(i,j)(2) = MB(i, j \vee 4) + \begin{pmatrix} 2 \\ 0 \end{pmatrix}$$

$$Rel^{IB}(i,j)(3) = MB(i, j \vee 4) + \begin{pmatrix} -2 \\ 0 \end{pmatrix}$$

$$Rel^{IB}(i,j)(4) = MB(i, j \vee 4 + j')$$

$$Rel^{IB}(i,j)(5) = MB(i, j \vee 4 + j') + \begin{pmatrix} 2 \\ 0 \end{pmatrix}$$

$$Rel^{IB}(i,j)(6) = MB(i, j \vee 4 + j') + \begin{pmatrix} -2 \\ 0 \end{pmatrix}$$

where the quotient of the euclidian division of a by b is denoted a∨b and its remainder amodb.

The second and third vectors have the same vertical component as the first vector, the horizontal components being modified. Similarly, the fifth and sixth vectors have the same vertical component as the fourth vector, the horizontal components being modified. This choice is due to the size of the intermediate blocks which are only two lines high. If intermediate blocks of larger vertical size had been chosen, it would have been conceivable to perform a correction of the vertical component. Here, however, with only two lines per intermediate block, it is difficult to determine a vertical component reliably and hence a fortiori to correct it.

The error associated with each of the six vectors is then calculated, doing so for each intermediate block. The vector picked from the six candidate vectors in respect of an intermediate block is the one giving the minimum error.

According to a variant embodiment, the correction on the horizontal components is omitted. This makes it possible to avoid generating excessively strong discontinuities in the vector field in the case of noise-affected images.

A vector field with mean spatial resolution denoted IB(i,j) is ultimately obtained.

The final step of the motion estimation for frame 3 consists in determining a vector field at sub-block level from the vector field at the intermediate blocks. Naturally a sub-block will be allocated to the intermediate block of which it forms part. According to the present example, two candidate vectors are determined for each sub-block: the first candidate vector is that of the intermediate block of which the sub-block forms part, whilst the second vector is that of the adjacent intermediate block as defined hereinbelow.

For a sub-block with coordinates (i,j), the two candidate vectors will be:

If imod8<4 then i'=−1 else i'=1

$Rel_{(i,j)}(1)=IB(i\vee 8, j\vee 4)$ $Rel_{(i,j)}(2)=IB(i\vee 8+i', j\vee 4)$

Therefore, the vectors will be calculated:

For m=1,2

$Front_{(i,j)}(m)=int(2/3 \cdot Rel_{(i,j)}(m))$ $Rear_{(i,j)}(m)=Rel_{(i,j)}(m)-Front_{(i,j)}(m))$ and then the errors:

For m=1,2

$$Err_{(i,j)}(m) = \sum_{\substack{k=0,2 \\ l=0,2}} \left| P'\left[\begin{pmatrix} S_x \cdot i + k \\ S_y \cdot j + l \end{pmatrix} + Front_{(i,j)}(m), 1\right] - \right.$$

$$\left. P'\left[\begin{pmatrix} S_x \cdot i + k \\ S_y \cdot j + l \end{pmatrix} - Rear_{(i,j)}(m), \frac{1}{2}\right] \right|$$

The vector giving the smallest error will be picked.

Median filtering of the vector field ($SB_3(i,j)$) obtained will also be carried out and the corresponding error field ($Err_3(i,j)$) will be calculated.

Noise Reduction

Noise reduction comprises two steps:

spatial noise reduction, motion-compensated temporal noise reduction.

The first step calls upon the information contained in a single frame, whilst the second step calls upon the information contained in several, in this instance two, successive frames.

In what follows only the filtering of the luminance will be described.

Within the context of the present example, the spatial filtering of the chrominance is not considered necessary, since the chrominance samples are too far apart for the directional-type median filter to have any sense. Obviously the chrominance could also be filtered, especially if the chrominance information is more dense, especially if it had a resolution identical to that of the luminance.

The temporal filtering of the chrominance is deduced directly from that of the luminance by considering input frames whose size is divided by the chrominance sub-sampling factor (i.e. by 2 in the abscissa direction x for a 4:2:2 input format). The x component of the motion vectors must also be divided by this same factor.

Spatial Noise Reduction

Spatial reduction of noise is intended to reduce the impulse noise in the input frames.

According to the present example embodiment, the spatial filter is a directional median filter which has the advantage of not degrading the edges and fine textures of an image. Straightforward linear or median filtering would not have this advantage.

The directional median filtering is carried out here on three pixels: the "current" pixel, as well as two adjacent pixels situated on the same line passing through the current pixel. In view of these restrictions, four filtering directions are possible: horizontal, vertical and two diagonal.

The choice of direction to be considered is made as a function of the correlation existing between the three pixels of one and the same direction.

The table below represents the current pixel (X22) surrounded by its adjacent pixels:

| x11 | x12 | x13 |
| --- | --- | --- |
| x21 | x22 | x23 |
| x31 | x32 | x33 |

The horizontal direction (termed d1) passes through the pixels X21, X22 and X23.

The vertical direction (termed d2) passes through the pixels X12, X22 and X32.

The first diagonal direction (d3) passes through the pixels X31, X22 and X13.

The second diagonal direction (d4) passes through the pixels X11, X22 and X23.

The correlation coefficients associated with each of the directions are respectively denoted c1 to c4 and the filtered values m1 to m4.

Along d1:

c1=min(|x21−x22|, |x23−x22|)

m1=med(x21, x22, x23)

Along d2:

c2=min(|x12−x22|, |x32−x22|)

m2=med(x12, x22, x32)

Along d3:

c3=min(|x13−x22|, |x31−x22|)

m3=med(x13, x22, x31)

Along d4:

c4=min(|x11−x22|, |x33−x22|)

m4=med(x11, x22, x33)

The direction for which the correlation coefficient is smallest will be picked.

Other correlation functions can also be chosen. Similarly, the filtering can be carried out on more than three pixels or in more than three directions, if the window used so permits.

Motion-Compensated Temporal Noise Reduction

A not inconsiderable benefit of motion estimation is that it allows the application of motion-compensated noise reduction processes.

We start from the assumption that the noise perturbing a television image has substantially zero mathematical expectation, that is to say its time average over several images tends to zero. The high-frequency components of this noise can therefore be reduced by carrying out temporal low-pass filtering of the image.

A known filtering process consists in carrying out pixel by pixel recurrent digital filtering. This process comprises the storage, for each pixel, of a number of samples, and the application of a recurrence relation between these stored values and a current pixel. It is thus possible to determine a filtered value for this current pixel as well as to update the stored values. The choice of the recurrence relation and the number of terms stored determine the effectiveness of the filter.

However, the application of a temporal low-pass filter to a sequence of television images has a major defect: through the very nature of this filtering it engenders a trail following all the moving objects, this phenomenon being similar to what may be observed on a cathode-ray tube having high remanence. This effect is very visible on some commercial television sets.

According to the present example embodiment, this effect is mollified by using the motion vectors already calculated when employing the recurrence relation. The recurrence will be carried out not on pixels with fixed coordinates, but on pixels translated by the motion vectors. In other words, the movement of the objects is followed so as to make image pixels of one and the same point of the moving object correspond.

Within the context of the present example, the temporal noise reduction is carried out with the help of a single frame memory on the input frames (spatially filtered). The vector field of maximum accuracy will be employed, namely the vector field of the sub-blocks. Hence, to begin with, the vectors will be calculated on the basis of the stored frame and the non-noise-reduced input frame. The vector field thus obtained will be used to reduce the noise in the input frame. The interpolation will be carried out between the input frame thus processed and between the stored frame: the two frames used in the interpolation will therefore have undergone noise reduction.

Within the context of the present example, a single frame memory is used: only a single past sample is picked for each pixel. The recurrence will therefore pertain to two terms: the "current" pixel and a stored sample.

The noise reduction is geared around two parts:

Matching up of the pixels to which the recurrence relation will pertain.

Application of the recurrence relation.

The matching up of the pixels is carried out sub-block by sub-block of the input frame. The pixels of a sub-block of the input frame and the pixels of the sub-block designated by the corresponding motion vector in the stored frame are matched up. A projection of the stored frame along the field of motion vectors is therefore carried out.

If the luminance of the input frame is denoted $$P\left[\begin{pmatrix} x \\ y \end{pmatrix}, t\right],$$

that of the noise-reduced frame contained in the memory is denoted $$\tilde{P}\left[\begin{pmatrix} x \\ y \end{pmatrix}, t\right]$$

and that of the projected frame is denoted $$\hat{P}\left[\begin{pmatrix} x \\ y \end{pmatrix}, t\right],$$

the latter can be written, for frame 2/3:

$\forall x \in \{0,1, \ldots, 720\}$ $\forall y \in \{1,3,5 \ldots, 575\}$ $$\hat{P}_{2/3}\left[\begin{pmatrix} x \\ y \end{pmatrix}, \frac{1}{2}\right] = \tilde{P}_1\left[\begin{pmatrix} x \\ y \end{pmatrix} - SB_2(i, j), 0\right]$$

with i=xmod4 j=ymod4

And for frame 4:

$\forall x \in \{0,1, \ldots, 720\}$ $\forall y \in \{0,2,4, \ldots, 574\}$ $$\hat{P}_4\left[\begin{pmatrix} x \\ y \end{pmatrix}, 1\right] = \tilde{P}_{2/3}\left[\begin{pmatrix} x \\ y \end{pmatrix} - SB_3(i, j), \frac{1}{2}\right]$$

with i=xmod4 j=ymod4

A recurrence relation now needs to be defined and applied. As indicated above it will pertain to $$\hat{P}\left[\begin{pmatrix} x \\ y \end{pmatrix}, t\right] \text{ and } P\left[\begin{pmatrix} x \\ y \end{pmatrix}, t\right]$$

and will give $$\tilde{P}\left[\begin{pmatrix} x \\ y \end{pmatrix}, t\right].$$

Figure 10A:
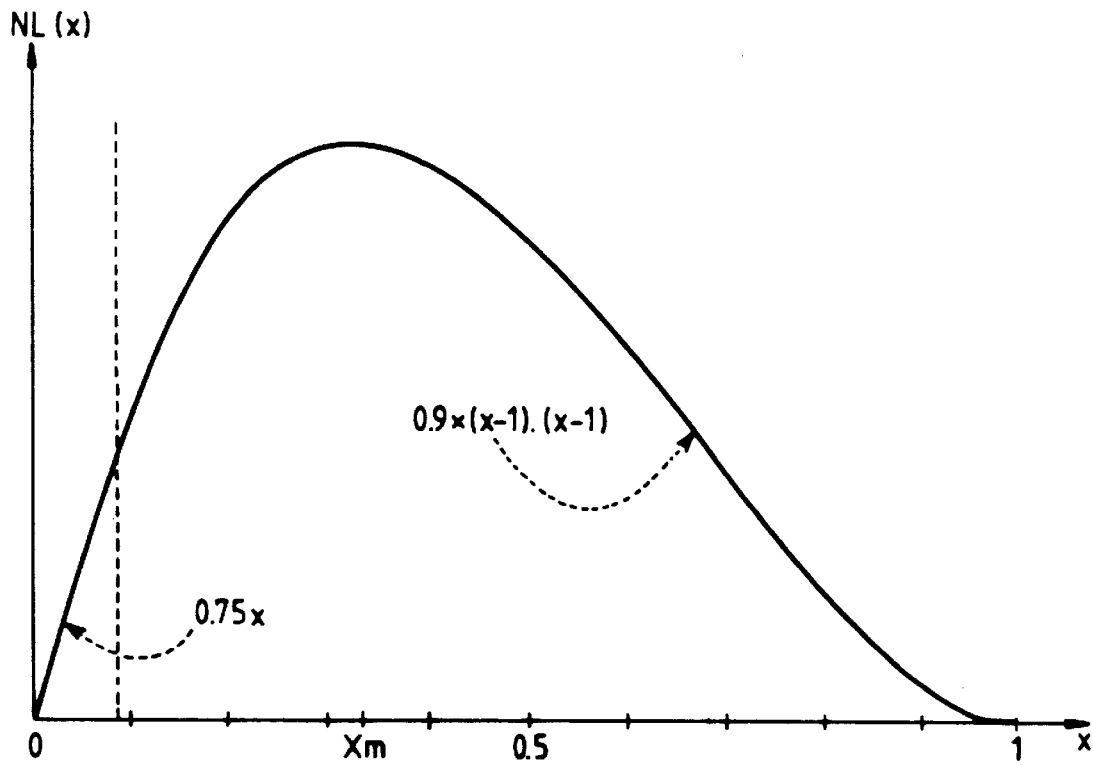
FIG. 10(a) represents a nonlinear function used by the process for recursive temporal noise reduction.
Figure 10B:
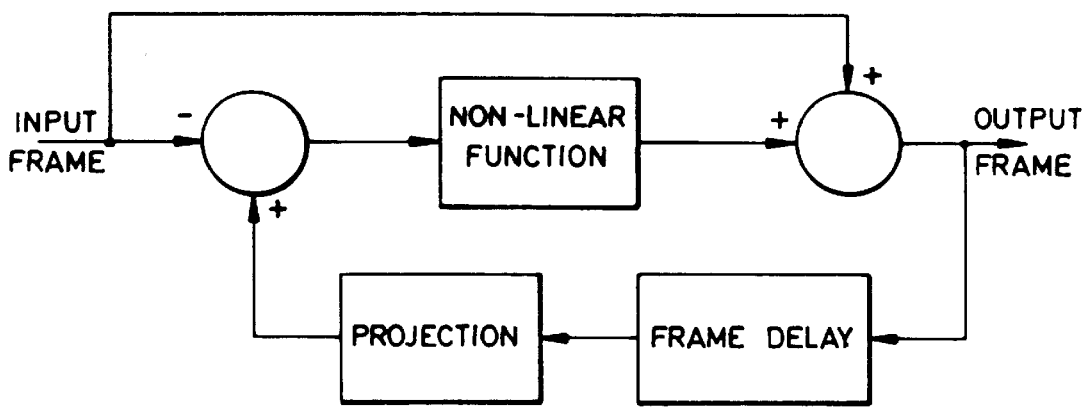
FIG. 10(b) is a block diagram of a filter for recursive temporal noise reduction.

Assuming that the appearance of an object changes little from one frame to the next, and in any case slowly relative to the time constant of the filter, the differences in brightness are due only to noise. Within the context of the present example, the recurrence relation used is therefore:

$$\tilde{P}\left[\begin{pmatrix} x \\ y \end{pmatrix}, t\right] = P\left[\begin{pmatrix} x \\ y \end{pmatrix}, t\right] + f\left(\tilde{P}\left[\begin{pmatrix} x \\ y \end{pmatrix}, t\right] - P\left[\begin{pmatrix} x \\ y \end{pmatrix}, t\right]\right)$$

where f is a non-linear function which is matched to the noise and arises from the non-linear function NL represented in FIG. 10(a), with the layout of the recurrent filter used (FIG. 10(b)). This function possesses a linear part at the start of its curve: for small differences between the image received and its projection, the correction is a maximum and the output pixel is linearly interpolated, with a factor ¾ for the projection and ¼ for the pixel received. If the difference increases, the probability of erasing a real transition in the image also increases and the pixel received is favoured by choice to the point that the estimate is entirely disregarded if the discrepancy is too large.

According to the present example embodiment, this function is matched to the variance of the noise estimated when calculating the motion vectors: this thus leads to forming the difference between the noise to be reduced and the information to be saved.

NL can then be written:

NL: $R^+ \to R$
$x \mapsto NL(x)$
$\forall 0 \leq x \leq 1$: $NL(x) = \min(3/4x, 9/10x \cdot (x-1)^2)$
$\forall x > 1$: $NL(x) = 0$.

f is the odd function from R into R defined on $R^+$ by:

$$f(x) = \frac{2s}{x_M} NL\left(\frac{x}{2s} \cdot x_M\right)$$

where s is the standard deviation of the noise measured by the algorithm and $x_M$ is the local maximum of the function NL.

We shall put:

s=Noiseest

According to a variant embodiment of the present example, the temporal noise reduction is not carried out when the confidence in a motion vector is too low relative to the noise of the image.

According to another variant embodiment, spatial filtering of the stored frame is carried out before the projection along the motion vector field. Thus, given the sub-sampling performed before the motion estimation, the accuracy of the motion vectors, and consequently of the projection, is two pixels. The finer details are eliminated by way of a linear low-pass filter. Measurements have shown that low-pass filtering lowers the noise level by around a further 2 dB.

Interpolation

After having obtained for each frame to be interpolated the most precise possible vector field, we need subsequently to deduce from this information and from the input frames, the frames which will be displayed. Different objectives will be targeted depending on the frame taken into consideration.

In particular, the following lines of conduct will be adhered to:

we shall attempt to retain a homogeneity in the various interpolation procedures matched to each frame: too abrupt a difference between two types of interpolation leads to differences of appearance from one frame to the next which, repeated 75 times a second, give rise to flicker which is more detrimental than that which it is sought to reduce;

we shall take the necessary measures in order for an error in a motion vector, even one which is large in value but sufficiently localized, or a difference between the actual and measured vector fields, due for example to quantization, not to create overly visible perturbation.

Moreover, the presence of noise in the image should not cause the interpolation process to fail.

Interpolation of Frame 1 (Luminance)

Frame 1 is a particular case in the sense that its even lines are enlisted as is. The odd lines must however be reconstructed.

The luminance of a pixel of frame 1 will be denoted $P_1(x,y)$ with ($0 \leq x \leq 719; 0 \leq y \leq 575$).

According to the present example embodiment several types of interpolation are employed to reconstruct the missing lines:

vertical linear interpolation by averaging (pure spatial filtering), interlacing of frames 1 and 3 in the stationary regions (pure temporal filtering), interpolation employing the motion vectors (spatio-temporal filtering).

The choice of the type of interpolation is made main block by main block on the basis of criteria linked with the vector and with the error associated with the block.

The vector associated with a main block of frame 1 is that associated with the main block with the same position in frame 2/3. These vectors are taken into consideration even though the motion estimation is not performed for the blocks of frame 1, but rather for the blocks of frame 2/3. Indeed, on receding from the edges of the objects in motion and if the motion is steady, the vectors obtained by direct estimation on the blocks of frame 1 will be similar to the vectors calculated for frame 2/3.

Vertical linear interpolation (pure spatial filtering) is a fallback solution used when the confidence in the detected motion vector is too low. For the present embodiment, we use the interpolation:

$$P_1[(x,y)] = \frac{1}{2}\left(P\left[\begin{pmatrix} x \\ y-1 \end{pmatrix}, 0\right] + P\left[\begin{pmatrix} x \\ y+1 \end{pmatrix}, 0\right]\right)$$

Vertical averaging has the drawback of betraying very visible "staircasing" on the diagonal lines. Moreover, it gives mediocre definition, at most equal to that of a conventional television set. Lastly, it necessarily creates line flicker since frames 2 and 3 cannot be interpolated in this way. It is therefore sought to avoid vertical averaging if possible.

This pure spatial filtering is employed inside the spatio-temporal filter described further on.

If the motion vector associated with a main block is zero, filtering is carried out which is referred to as pure temporal filtering in the sense that the missing lines of frame 1 are chosen from another frame. In this way an interlacing of the lines of two frames is carried out. The criterion chosen to determine the static nature of a main block is the comparison of the error of the motion estimate with a threshold. If the error is less than this threshold, then the block is deemed static. Thus, if only a part of the block is static, the other part will nevertheless engender a sizeable error.

The criterion can be written:

MBError(i,j)<Threshold×Noisest and the interpolated pixel will be written:

for y even:

$P_1(x, y)=P(x, y, 0)$ for y odd:

$P_1(x, y)=P(x, y, 1/2)$

This type of interpolation makes it possible, as compared with interpolation of averaged vertical type, to allow double vertical definition and to remove line flicker.

If the motion vector is non-zero or if the motion vector is zero but the previously defined criterion relating to the associated error is not fulfilled, then spatio-temporal filtering is used for the interpolation. Within the context of the present example, this is filtering of median type.

A filter of median type makes it possible to preserve good definition and respect the edges of the image, unlike purely linear filters.

Figure 11:
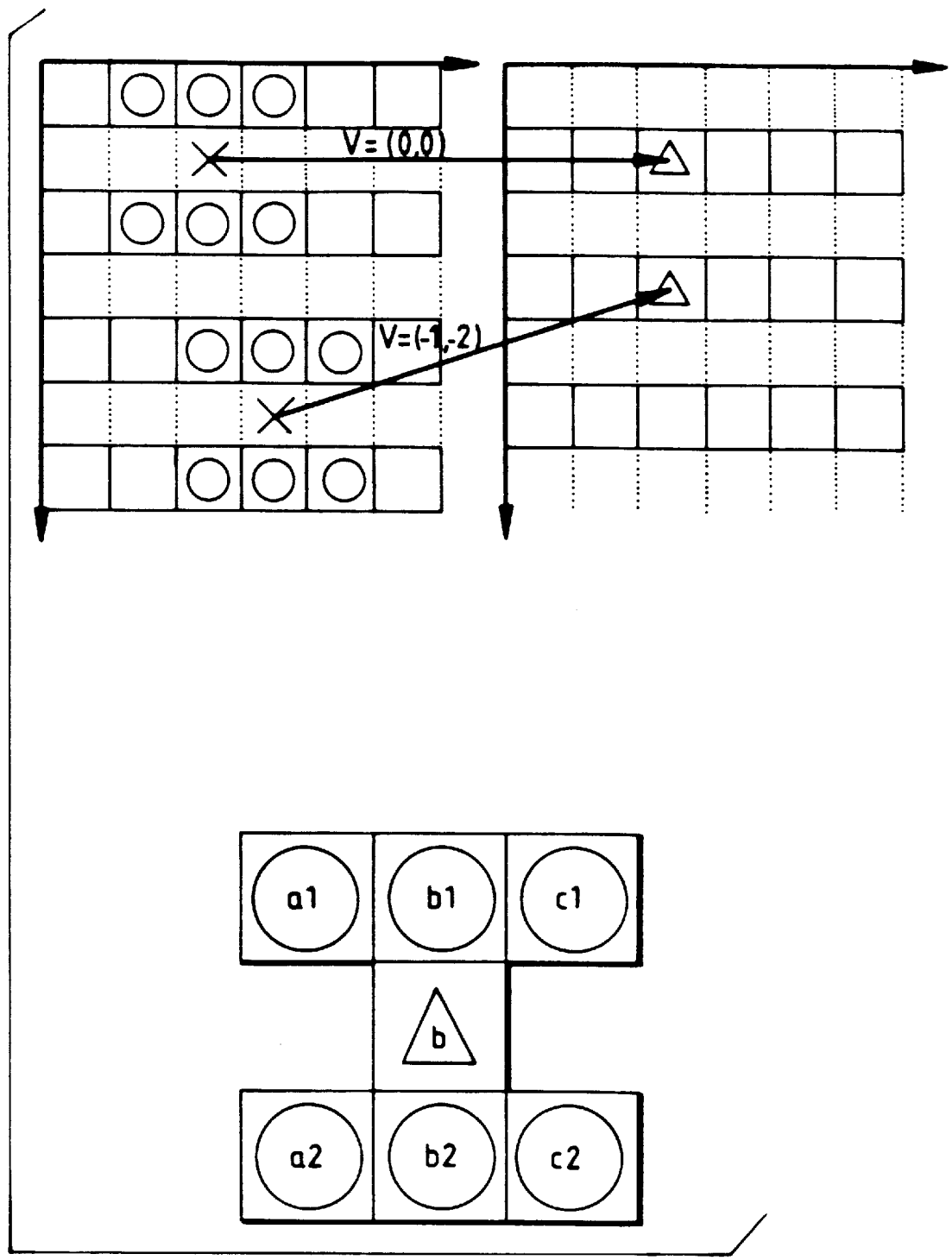
FIG. 11 represents a spatio-temporal filter of median type used for the interpolation of frame 1.

FIG. 11 illustrates this type of interpolation. In this figure an "X" denotes the pixel to be interpolated, a nought denotes a pixel of frame 1 and a triangle a pixel of frame 2/3.

The value of an interpolated pixel is determined in two stages:

in a first stage, three values corresponding to three filters F1, F2 and F3 are determined, F1 averages the values of pixel (b1) situated above the pixel to be interpolated and of pixel (b2) situated below the pixel to be interpolated, F2 gives the median value between b1, b2 and the value of pixel (b) of frame 2/3 corresponding to the translation by the appropriate motion vector of the pixel to be interpolated of frame 1, F3 gives the median value out of the value of pixel b and the values of the four pixels (a1, c1, a2, c2) diagonally adjacent to the pixel to be interpolated, in a second stage, the median value out of the three values given by these filters is determined.

Let MB(i,j) be the vector of the main block of which the pixel which it sought to interpolate forms part.

Let:

$v_x=(1\ 0)\cdot MB(i, j)$
$v_y=(0\ 1)\cdot MB(i, j)$

For y even:

$$P_1(x, y) = P\left[\begin{pmatrix} x \\ y \end{pmatrix}, 0\right]$$

For y odd:

$$F1(x, y) = \frac{1}{2}\left(P\left[\begin{pmatrix} x \\ y-1 \end{pmatrix}, 0\right] + P\left[\begin{pmatrix} x \\ y+1 \end{pmatrix}, 0\right]\right)$$

$$F2(x, y) = \text{med}_3\left(P\left[\begin{pmatrix} x \\ y-1 \end{pmatrix}, 0\right]; P\left[\begin{pmatrix} x \\ y+1 \end{pmatrix}, 0\right]; P\left[\begin{pmatrix} x+v_x \\ y+v_y \end{pmatrix}, \frac{1}{2}\right]\right)$$

$$F3(x, y) = \text{med}_5\left(P\left[\begin{pmatrix} x-1 \\ y-1 \end{pmatrix}, 0\right]; P\left[\begin{pmatrix} x-1 \\ y+1 \end{pmatrix}, 0\right];\right.$$
$$\left. P\left[\begin{pmatrix} x+1 \\ y-1 \end{pmatrix}, 0\right]; P\left[\begin{pmatrix} x+1 \\ y+1 \end{pmatrix}, 0\right]; P\left[\begin{pmatrix} x+v_x \\ y+v_y \end{pmatrix}, \frac{1}{2}\right]\right)$$

Lastly:

$P_1(x, y)=\text{med}_3(F1(x, y); F2(x, y); F3(x, y))$

A filter is thus constructed pertaining to seven values of pixels, only one of which does not belong to the current frame. The effects due to poor motion estimation are thus mollified.

On the other hand, definition will be preserved and the contours of the objects will be closely followed on account of the directional median filtering which acts both in the vertical and diagonal directions.

Interpolation of Frame 2 (Luminance)

The interpolation of frame 2 is performed on the basis of the vector field at sub-block level. All the pixels of the frame should be interpolated since it is not merged temporally with an input frame, as is the case for frame 1.

For the sake of homogeneity, the interpolation mechanisms used for frame 2 possess similar characteristics to those already employed for frame 1.

We therefore proceed sub-block by sub-block.

In the same way as for frame 1, if the error linked with the motion vector of a sub-block is large, the interpolation is carried out with the spatio-temporal filter already used for frame 1. However, since frame 2 is situated temporally between frame 1 and frame 2/3, the vector of motion between frames 1 and 2/3 is separated into two vectors, one (front vector) indicating the motion between frame 1 and frame 2, and the other indicating the motion between frame 2 and frame 2/3. Each of these two vectors is rounded to a whole value. It is recalled that an identical splitting of a motion vector into two vectors was used when calculating the motion vectors associated with the sub-blocks of frame 2. The roundings will be performed in the same way in both cases so as to avoid adding errors.

If (i,j) represents the coordinates of the sub-block containing the pixel to be interpolated, we shall calculate the vectors:

$\text{Rear}(i,j)=\text{int}[2/3\cdot SB_2(i,j)]$
$\text{Front}(i,j)=SB_2(i,j)-\text{Rear}(i,j)$ Next, three preliminary values (a, b, c) are determined. The calculation differs depending on whether the pixel to be interpolated is situated in an even or odd line.

For y even, let $$a = P\left[\begin{pmatrix} x \\ y-1 \end{pmatrix} + \text{Front}(i, j), \frac{1}{2}\right]$$

$$b = P\left[\begin{pmatrix} x \\ y \end{pmatrix} - \text{Rear}(i, j), 0\right]$$

$$c = P\left[\begin{pmatrix} x \\ y+1 \end{pmatrix} + \text{Front}(i, j), \frac{1}{2}\right]$$

then:

$$P_2(x, y) = \text{med}_3\left(\frac{(2*a+b)}{3}; \text{med}_3(a, b, c); \frac{(2*c+b)}{3}\right)$$

For y odd, we put similarly:

$$a = P\left[\begin{pmatrix} x \\ y-1 \end{pmatrix} - \text{Rear}(i, j), 0\right]$$

$$b = P\left[\begin{pmatrix} x \\ y \end{pmatrix} + \text{Front}(i, j), \frac{1}{2}\right]$$

-continued $$c = P\left[\begin{pmatrix} x \\ y+1 \end{pmatrix} - Rear(i, j), 0\right]$$

then:

$$P_2(x, y) = med_3\left(\frac{(a+2*b)}{3}; med_3(a, b, c); \frac{(c+2*b)}{3}\right)$$

Figure 13:
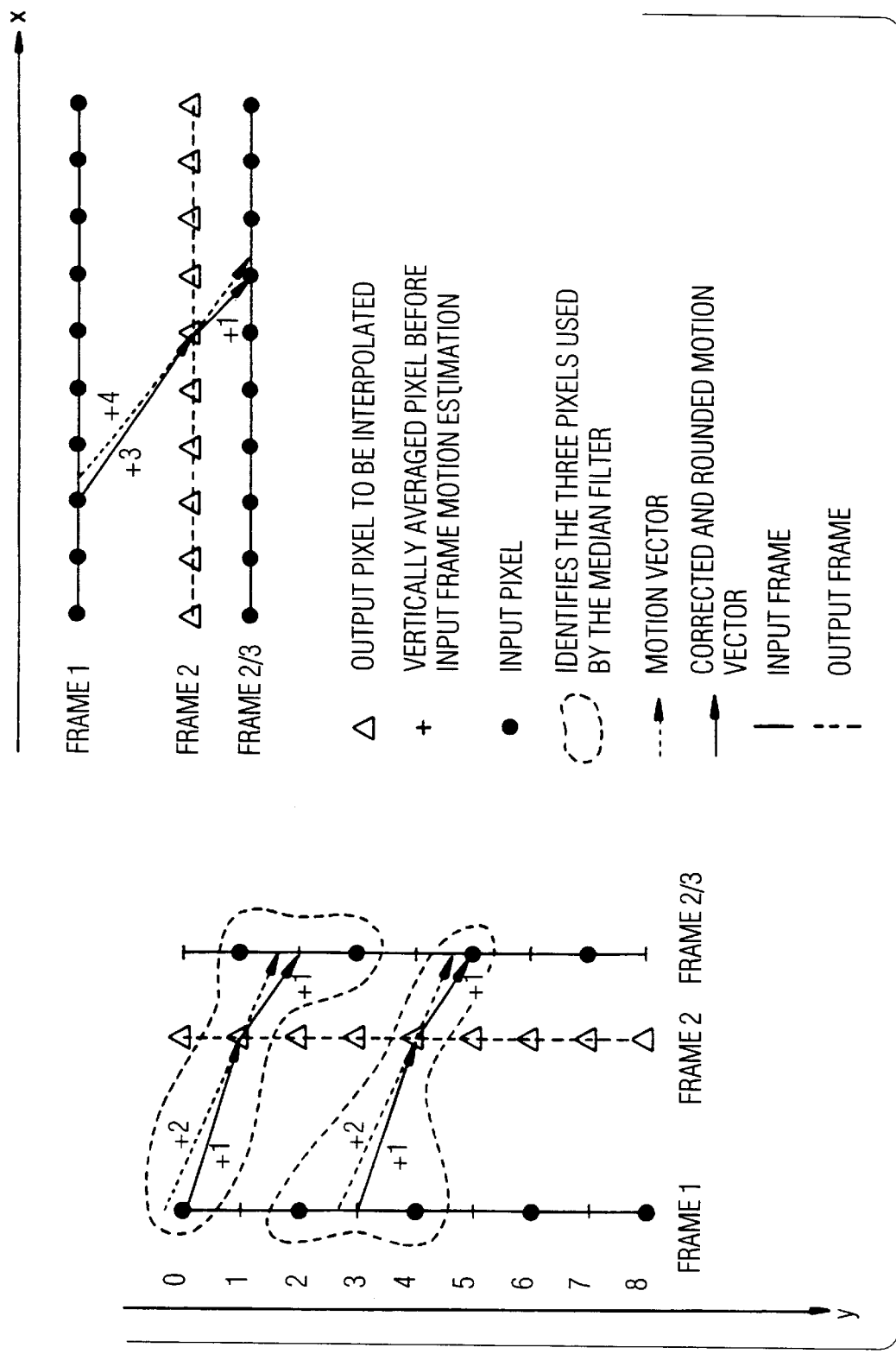
FIG. 13 gives two examples of the implementation of the spatio-temporal filter used for the interpolation of frame 2, FIG. 14 gives two examples of the implementation of the spatio-temporal filter used for the interpolation of frame 3.

This filtering is illustrated by FIG. 13.

$P_2(x,y)$ is the value of the interpolated pixel and corresponds to the median value out of three values: the results from two linear filters and one median filter based on the values of the pixels a, b and c.

The two linear filters carry out temporal interpolation with weighting coefficients corresponding to the relative positions of the pixel to be interpolated with respect to the pixels a, b, c. It should be noted that these are two pure temporal filters, that is to say they use just a single pixel in each of the input frames. This makes it possible to avoid loss of vertical resolution.

The median filter also makes it possible to preserve good spatial resolution in the frame generated. However, it also makes it possible to retain some homogeneity between the various interpolation mechanisms for the three frames.

If the motion vector linked with a sub-block is zero and if the confidence accorded to a vector is good (low error), the interpolation will, as in the case of frame 1, be of pure temporal interpolation type: the lines of frames 1 and 2/3 are interlaced:

For y even:

P'$_2$(x, y)=P(x, y,0)

For y odd:

P'$_2$(x, y)=P(x, y, 1/2)

According to a variant embodiment, a second possible value for this pixel, termed the fallback value, is also calculated. This value, denoted Fallback$_2$(x,y), corresponds to linear filtering which very severely cuts off the high spatial frequencies in both frames concerned:

$$Fallback_2(x, y) = \frac{1}{16}(1\ 2\ 3\ 4\ 3\ 2\ 1)\left|\frac{1}{3}\begin{pmatrix} P(x-3, y, 0) \\ P(x-2, y, 0) \\ P(x-1, y, 0) \\ P(x, y, 0) \\ P(x+1, y, 0) \\ P(x+2, y, 0) \\ P(x+3, y, 0) \end{pmatrix} + \frac{2}{3}\begin{pmatrix} P(x-3, y, \frac{1}{2}) \\ P(x-2, y, \frac{1}{2}) \\ P(x-1, y, \frac{1}{2}) \\ P(x, y, \frac{1}{2}) \\ P(x+1, y, \frac{1}{2}) \\ P(x+2, y, \frac{1}{2}) \\ P(x+3, y, \frac{1}{2}) \end{pmatrix}\right|$$

The pixel values undefined in the frames will be interpolated by simply using a vertical spatial filter on the upper and lower pixels.

The confidence placed in a motion vector is also defined as:

$$Conf(x, y) = \frac{Error_2(x, y)}{NBPixel}$$

where NBPixel represents the number of pixels contained in a sub-sampled block. Conf(x,y) represents the error referred to a pizel.

The value $P_2(x,y)$ of the interpolated pixel will then be:

$$P_2(x, y) =$$
$$med_3\left(P_2(x, y) - \frac{Conf(x, y)}{Scale}, Fallback(x, y)P_2(x, y) + \frac{Conf(x, y)}{Scale}\right)$$

The value $P_2(x,y)$ is equal to the motion-compensated pixel value but bounded in such a way as to not be able to deviate from the value of the fallback pixel by a value greater than the confidence divided by a corrective factor.

Interpolation of Frame 3 (Luminance)

The mechanisms are very similar to those employed for frame 2. Frame 3 is interpolated from frames 2/3 and 4 (that is to say frame 1 of the following cycle) and from the vectors of the sub-blocks SB$_3$(i,j). Only the interpolation coefficients and the parity aspects of the lines will change.

The following vectors will therefore be calculated:

Front(i,j)=int[2/3·SB$_3$(i,j)]

Rear(i,j)=SB$_3$(i,j)−Front(i,j)

and the following points will be calculated:

For y odd, let $$a = P\left[\begin{pmatrix} x \\ y-1 \end{pmatrix} + Front(i, j), 1\right]$$

$$b = P\left[\begin{pmatrix} x \\ y \end{pmatrix} - Rear(i, j), \frac{1}{2}\right]$$

$$c = P\left[\begin{pmatrix} x \\ y+1 \end{pmatrix} + Front(i, j), 1\right]$$

then:

$$P_3(x, y) = med3\left(\frac{(a+2*b)}{3}; med3(a, b, c); \frac{(c+2*b)}{3}\right)$$

For y even, we put similarly:

$$a = P\left[\begin{pmatrix} x \\ y-1 \end{pmatrix} - Rear(i, j), \frac{1}{2}\right]$$

$$b = P\left[\begin{pmatrix} x \\ y \end{pmatrix} + Front(i, j), 1\right]$$

$$c = P\left[\begin{pmatrix} x \\ y+1 \end{pmatrix} - Rear(i, j), \frac{1}{2}\right]$$

then:

$$P3(x, y) = med3\left(\frac{(2*a+b)}{3}; med3(a, b, c); \frac{(2*c+b)}{3}\right)$$

Figure 14:
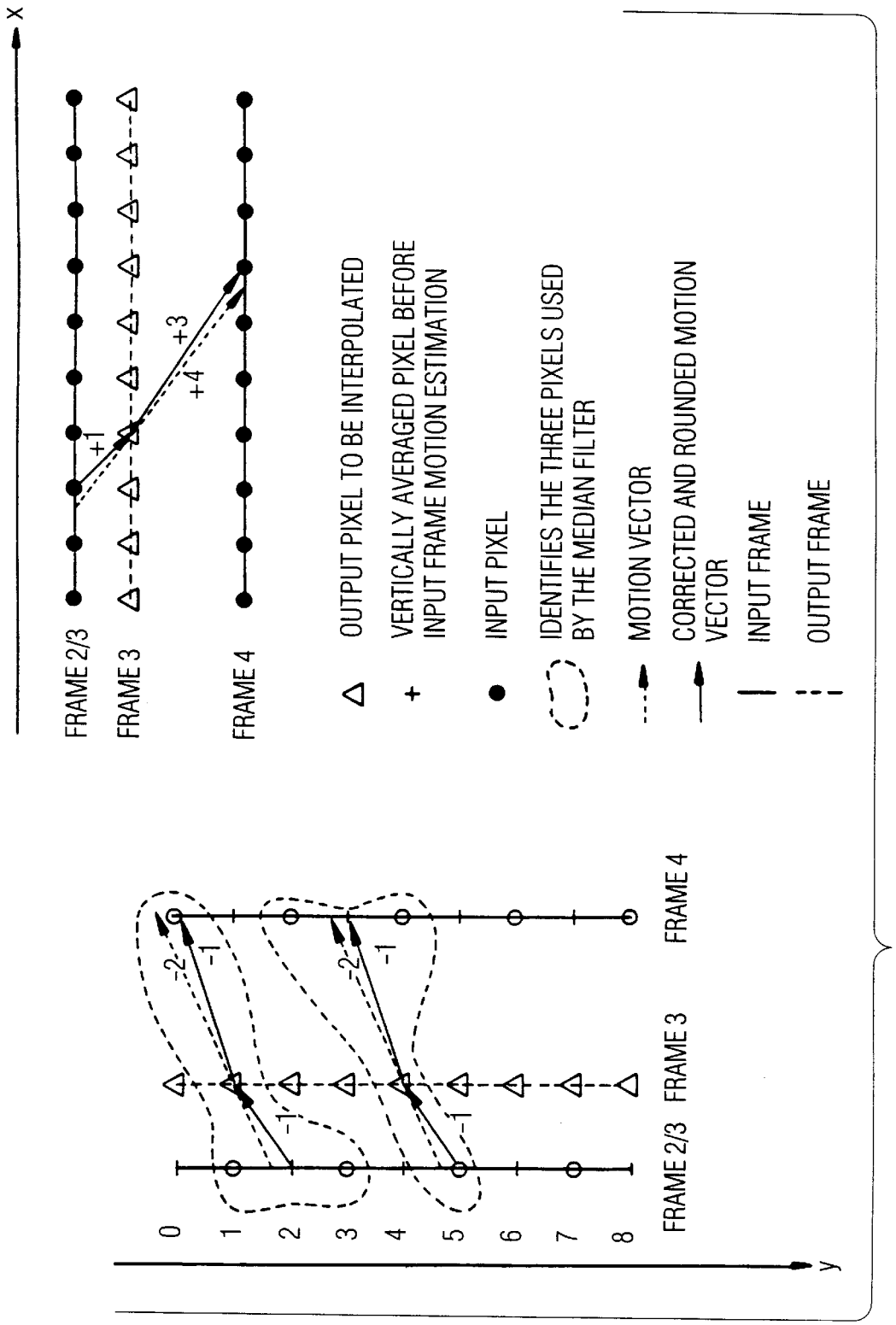

FIG. 14 illustrates this filtering.

If the confidence is very good and the vector zero, then pure temporal interpolation will again be opted for:

y even:

P$_3$(x,y)=P(x,y,1)

y odd:
$P_3(x,y)=P(x,y,1/2)$
The fallback pixel will be calculated next, $$Fallback3(x, y) = \frac{1}{16}(1\ 2\ 3\ 4\ 3\ 2\ 1)\left[\frac{2}{3}\begin{pmatrix}P\left(x-3, y, \frac{1}{2}\right)\\P\left(x-2, y, \frac{1}{2}\right)\\P\left(x-1, y, \frac{1}{2}\right)\\P\left(x, y, \frac{1}{2}\right)\\P\left(x+1, y, \frac{1}{2}\right)\\P\left(x+2, y, \frac{1}{2}\right)\\P\left(x+3, y, \frac{1}{2}\right)\end{pmatrix} + \frac{1}{3}\begin{pmatrix}P(x-3, y, 1)\\P(x-2, y, 1)\\P(x-1, y, 1)\\P(x, y, 1)\\P(x+1, y, 1)\\P(x+2, y, 1)\\P(x+3, y, 1)\end{pmatrix}\right]$$

and the confidence which is placed in the motion vector, $$Conf(i, j) = \frac{Error_3(i, j)}{NBpixel}$$

Lastly, the value of the pixel displayed will be established while precluding this pixel from deviating too far from the value of the fallback pixel if the confidence is poor:

$$P_{3/out}(i, j) = med\left(P'_3(i, j) - \frac{Conf(i, j)}{Scale}, Fallback_3(i, j), P'_3(i, j) + \frac{Conf(i, j)}{Scale}\right)$$

It is seen that here, the continuity of the interpolation is properly ensured with the preceding frame since the algorithm is copied from the interpolation of frame 2. However, the vectors of sub-blocks have a time bias—owing to the fact that they were calculated from main blocks determined for the preceding output frame—which makes the definition of this frame poorer than that of the preceding frame, especially in the case of rapidly shifting movements.

Processing of the Chrominance

The interpolation of the chrominance is subject to much less severe constraints than that of the luminance; thus, the definition of the eye is much weaker. Besides, the standard used for transmission over the Hertzian network, the so-called 4:1:1 format, includes sub-sampling culminating in the transmission of one chrominance cue for four luminance cues, with a repeat of the selfsame chrominance cue every two lines. The tolerances on the filters used are therefore much larger. Because of this we shall be content with simplified filters.

The chrominance interpolation algorithms are therefore extrapolated directly from those for luminance interpolation, by considering frames containing half as many pixels horizontally, and therefore by halving the horizontal component of the motion vectors.

For frame 1, the filter with 7 input pixels which is used in luminance mode is limited to 3 input pixels:
Let:
$v_x=1/2(1\ 0)\cdot MB(i,j)$
$v_y=(0\ 1)\cdot MB(i,j)$ For y even:

$$P_1(x, y) = P\left[\begin{pmatrix}x\\y\end{pmatrix}, 0\right]$$

For y odd:

$$F1(x, y) = \frac{1}{2}\left(P\left[\begin{pmatrix}x\\y-1\end{pmatrix}, 0\right] + P\left[\begin{pmatrix}x\\y+1\end{pmatrix}, 0\right]\right)$$

$$F2(x, y) = med3\left(P\left[\begin{pmatrix}x\\y-1\end{pmatrix}, 0\right]; P\left[\begin{pmatrix}x\\y+1\end{pmatrix}, 0\right]; P\left[\begin{pmatrix}x+v_x\\y+v_y\end{pmatrix}, \frac{1}{2}\right]\right)$$

$$F3(x, y) = P\left[\begin{pmatrix}x+v_x\\y+v_y\end{pmatrix}, \frac{1}{2}\right]$$

Lastly:
$P_1(x,y)=med3(F1(x,y); F2(x,y); F3(x,y))$

For frames 2 and 3, the temporal median filters for the luminance are retained, but the fallback filter is omitted. The horizontal filter is omitted from the filter for temporal noise reduction, since it would filter down the spatial frequencies excessively.

Film Mode

Film mode is the case of video sequences generated at the 625/25/1 rather than the 625/50/2 format. These sequences are therefore in a progressive format on input, which means that each input image contains 2 frames corresponding to the same instant.

The whole problem stems from this: thus, if the algorithm described hereinabove, without any modification, is applied to such sequences, the motion estimate will be completely disabled since the calculation of the main blocks will be done between the two frames of the same image, and all the successive estimates which follow from these blocks will merely generate zero vectors. Hence, if no motion is detected, no temporal interpolation or motion compensation can be done. This is very detrimental since on displaying such sequences, each input image can only be repeated 3 times on the screen. This results in a particularly disconcerting jerking effect in any sequence containing motion.

A simple and inexpensive solution enabling this jerking effect to be considerably reduced is the following: the information processing phase will be modified in such a way that the motion between 2 different images is detected and estimated, and hence that temporal interpolation is possible.

Figure 15:
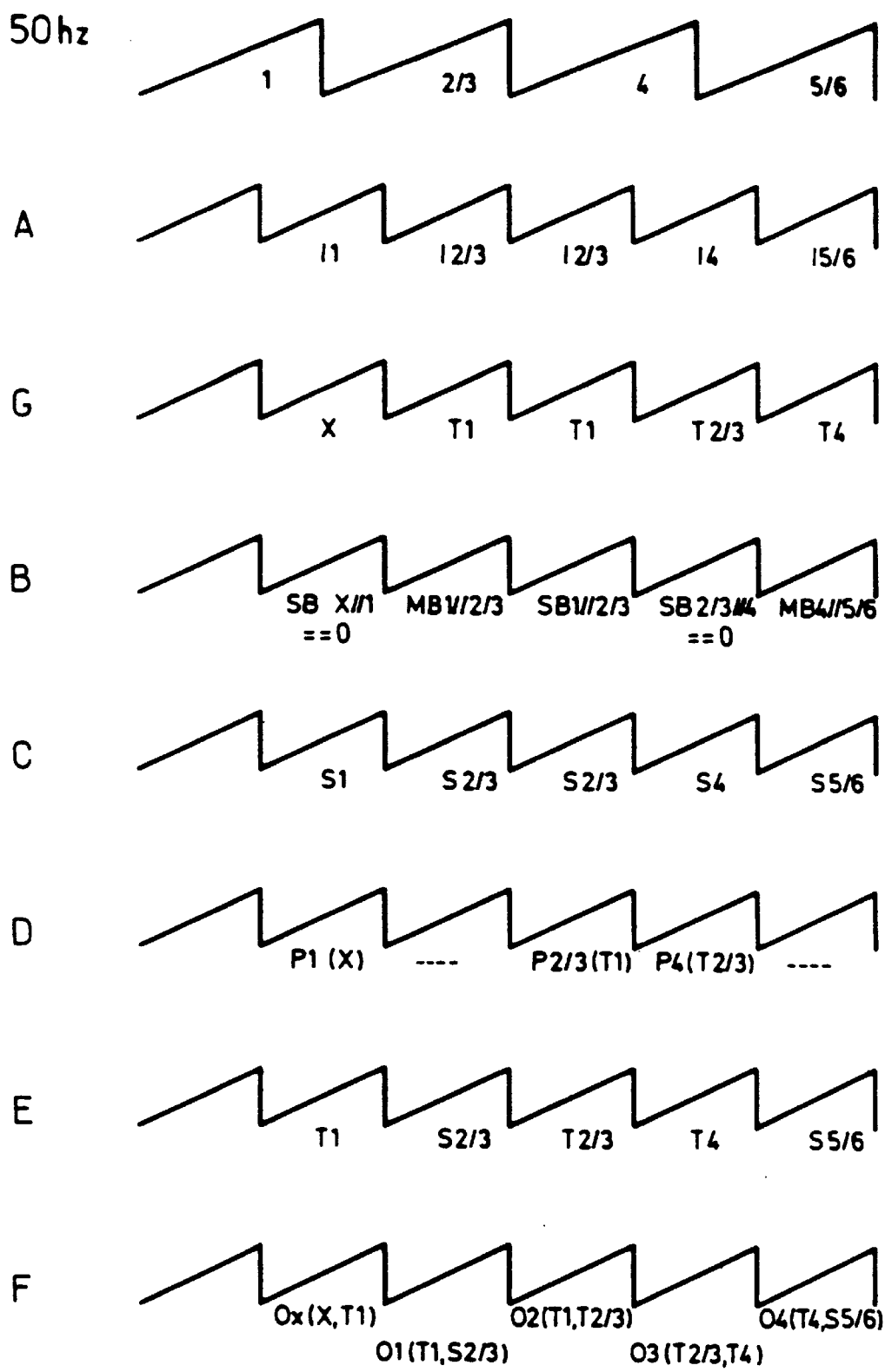
FIG. 15 represents a timechart of the frames at certain points of the device of FIG. 2 during the film mode, and FIG. 16 comprises three layouts (a,b,c) of frames with respect to time respectively illustrating the normal mode of operation in respect of video frames, the normal mode of operation in respect of film frames and the specific mode of operation in respect of film frames.

Consequently, the main motion estimate (the main blocks phase) will have to be made between an even frame 1 and an odd frame 2/3 rather than between an odd frame 1 and an even frame 2/3. The timecharts given in FIG. 15 illustrate this particular mode of operation.

Figure 16A:
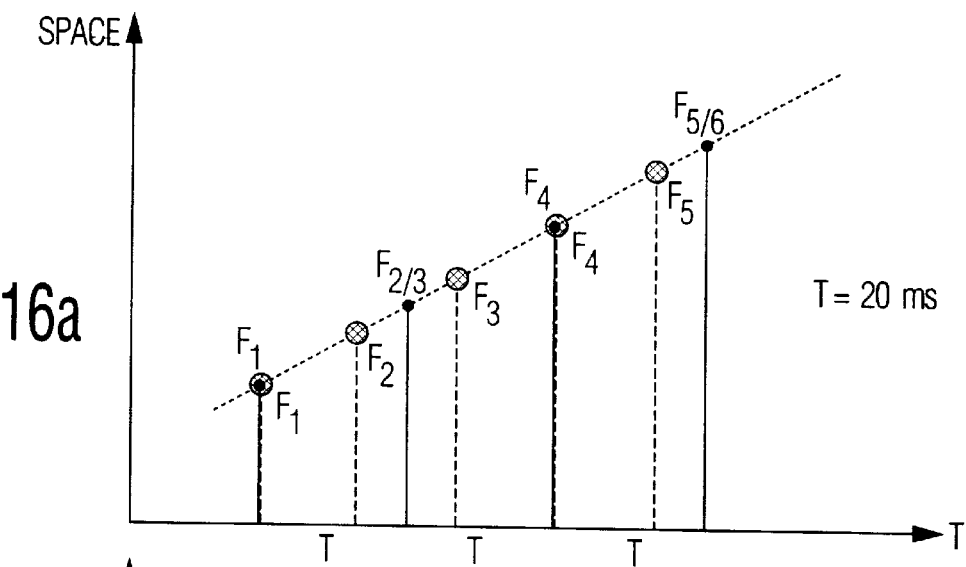
Figure 16B:
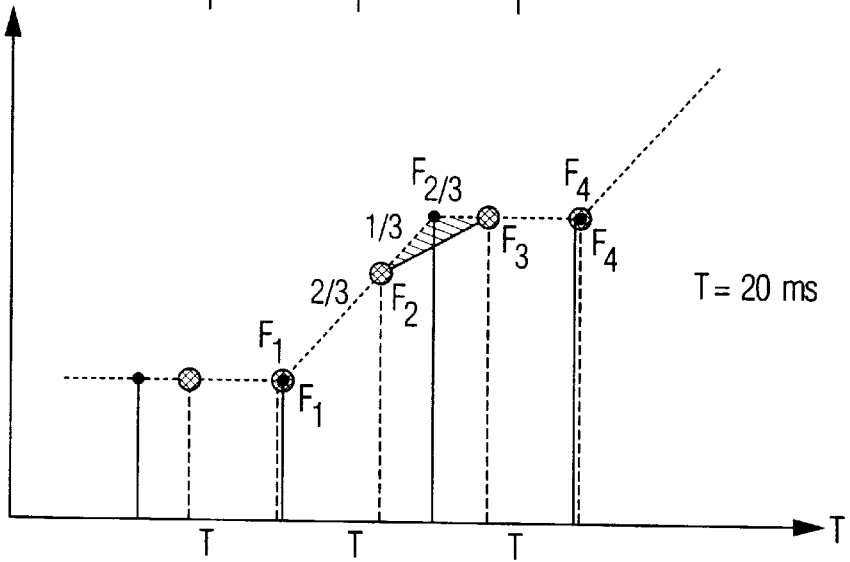
Figure 16C:
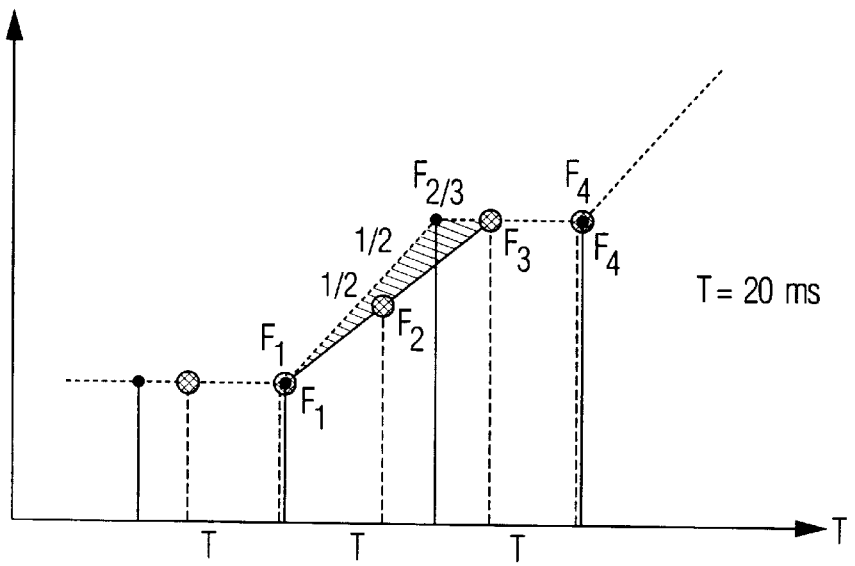

The whole processing will thus be shifted by one 50 Hz frame. This means that at output the lines to be interpolated will have the opposite parity to that which they have during normal processing. However, the filters and the motion estimator will operate in strictly identical fashion. Thus the following will be generated in succession;

a progressive frame 1 by using the vector field of main blocks, by retaining the input lines and interpolating the others with the previously described spatio-temporal median filter with 7 points, a progressive frame 2 by using the vector field of sub-blocks which was estimated with input frames 1 and 2/3. Here also, the previously described temporal median filter with 3 points will be used. On the other hand, instead of applying the ordinary weighting coefficients 2/3 and 1/3, the coefficients 1/2 and 1/2 will be used; this means that frame 2 which is generated in this way is situated equidistant between input frames 1 and 2/3. This simple modification of the coefficients itself constitutes a significant reduction in jerk, which is clearly noticeable and discernible in all the images which have been processed. See FIG. 16 for the layout explaining this reduction in jerk.

and lastly, a progressive frame 3 normally using the sub-blocks vector field corrected by the intermediate blocks. In fact, here, since frames 2/3 and 4 emanate from the same image, there is no motion between these two frames. It therefore suffices to set the vectors to zero and also the confidence: in this way the filter described previously will purely and simply interlace the 2 input frames so as to regenerate a perfect progressive image.

In conclusion, it will be possible to process the film mode without modifying the filters and motion estimation mechanisms: it will suffice to control, should the presence of the film mode have been detected, the phase of processing, the interpolation coefficients of the filter for frames 2 as well as the vectors and confidences of frames 3. The reduction in jerk thus obtained will therefore be inexpensive to implement.

What is claimed is:

1. Process for converting interlaced frames into progressive frames comprising a change of frame frequency by interpolation and motion compensation wherein when a motion vector associated with a pixel to be interpolated is non-zero or when this vector is zero, but the confidence accorded to this vector is less than a given threshold, the interpolation of a pixel (x,y) of a frame situated temporally between two input frames is carried out by a combination of median filtering and motion compensation linear and median filtering comprising:

obtaining by a first motion-compensated linear temporal filter a first interpolated value based on a first set of pixels;

obtaining by a second motion-compensated linear temporal filter a second interpolated value based on a second set of pixels;

obtaining by a motion-compensated median temporal filter a third median value based on a third set of pixels; and median filtering according to said first and second interpolated values and said third median value to obtain a value corresponding to said interpolated pixel (x,y).

2. Process according to claim 1, wherein the confidence accorded to a vector is a linear function of the error engendered by this vector.

3. Process according to claim 1 wherein the said linear filters are dependent on two pixels (a,b respectively b,c) situated respectively in the input frames temporally surrounding the frame to be interpolated, the linear interpolation coefficients of each pixel corresponding to the ratio of the time intervals separating the frame to be interpolated and the preceding input frame and the following input frame respectively.

4. Process according to claim 1 wherein when the preceding input frame is odd, the said median temporal filter pertains to the following three pixels:

For the even lines of the frame to be interpolated, $$a = P\left[\begin{pmatrix} x \\ y-1 \end{pmatrix} + Front(i, j), \frac{1}{2}\right]$$

$$b = P\left[\begin{pmatrix} x \\ y \end{pmatrix} - Rear(i, j), 0\right]$$

$$c = P\left[\begin{pmatrix} x \\ y+1 \end{pmatrix} + Front(i, j), \frac{1}{2}\right]$$

then:
$P_2(x,y)$=med(ma+(1−m)b;med(a,b,c);mc+(1−m)b)

For the odd lines of the frame to be interpolated, $$a = P\left[\begin{pmatrix} x \\ y-1 \end{pmatrix} - Rear(i, j), 0\right]$$

$$b = P\left[\begin{pmatrix} x \\ y \end{pmatrix} + Front(i, j), \frac{1}{2}\right]$$

$$c = P\left[\begin{pmatrix} x \\ y+1 \end{pmatrix} - Rear(i, j), 0\right]$$

then:
$P_2(x,y)$=med((1−m)a+mb; med(a,b,c);(1−m)c+mb)

where Front(i,j) and Rear(i,j) are the fractions of the motion vector associated with the pixel to be interpolated, this vector being scaled and rounded, where "0" and "1/2" respectively represent the input frame preceding respectively following the frame to be interpolated, and where m represents an interpolation coefficient depending on the position of the frame to be interpolated between the input frames.

5. Process according to claim 1 wherein when the preceding input frame is odd, the said median temporal filter pertains to the following three pixels:

For the odd lines of the frame to be interpolated:

$$a = P\left[\begin{pmatrix} x \\ y-1 \end{pmatrix} + Front(i, j), 1\right]$$

$$b = P\left[\begin{pmatrix} x \\ y \end{pmatrix} - Rear(i, j), \frac{1}{2}\right]$$

$$c = P\left[\begin{pmatrix} x \\ y+1 \end{pmatrix} + Front(i, j), 1\right]$$

then:
$P_3(x,y)$=med((1−n)a+b;med(a,b,c);(1−n)c+b)

For the even lines of the frame to be interpolated:

$$a = P\left[\begin{pmatrix} x \\ y-1 \end{pmatrix} - Rear(i, j), \frac{1}{2}\right]$$

$$b = P\left[\begin{pmatrix} x \\ y \end{pmatrix} + Front(i, j), 1\right]$$

$$c = P\left[\begin{pmatrix} x \\ y+1 \end{pmatrix} - Rear(i, j), \frac{1}{2}\right]$$

then:
P3(x,y)=med(na+(1−n)b;med(a,b,c)nc+(1−n)b)

where Front(i,j) and Rear(i,j) are the fractions of the motion vector associated with the pixel to be interpolated, this vector being scaled and rounded, where "1/2" and "1" respectively represent the input frame preceding respectively following the frame to be interpolated, and where n represents an interpolation coefficient depending on the position of the frame to be interpolated between the input frames.

6. Process according to claim 3 wherein the two pixels used for each linear filter are chosen from the group of three pixels used by the median temporal filter.

7. Process according to claim 1 wherein
the interlaced input frames emanate from progressive input images of frequency 25 Hz and that the frequency of the output frames is 75 Hz, a first output frame (F1) being temporally merged with the second frame emanating from a first input image, a second output frame (F2) being temporally situated between the said first input frame and the first frame (F2/3) emanating from a second input image, a third output frame (F3) being temporally situated between the two input frames (F2/3, F4) emanating from the said second input image,
the interpolation coefficients used by the said temporal filters are 1/2 for the said second output frame.

8. Process according to claim 7, wherein
the pixels of the said third output frame are the pixels of the second input image.

9. Process according to claim 1 wherein when the motion vector associated with a pixel to be interpolated is zero and the confidence in this vector exceeds a given threshold, then the value of the pixel to be interpolated is the final value obtained by median filtering between
firstly two pixel values, one of which is obtained by subtracting the motion vector confidence referred to the pixel and divided by a corrective factor from the value of the pixel with the same position as the pixel to be interpolated in, either, the preceding input frame or the following input frame, and the other obtained by adding the motion vector confidence referred to the pixel and divided by the corrective factor to the value of the pixel with the same position as the pixel to be interpolated in, either, the preceding input frame or the following input frame, and
secondly a fallback value which results from a temporal and horizontal linear filtering on the pixels of the lines of the preceding and following input frames with identical position to the line containing the pixel to be interpolated, a vertical spatial filtering being performed if appropriate on the undefined lines of the input frames.

10. Process according to claim 9, wherein the fallback value is equal to:

$$Fallback\ (x, y) = \frac{1}{16}(1\ 2\ 3\ 4\ 3\ 2\ 1)\left|m\begin{pmatrix}P(x-3,y,0)\\P(x-2,y,0)\\P(x-1,y,0)\\P(x,y,0)\\P(x+1,y,0)\\P(x+2,y,0)\\P(x+3,y,0)\end{pmatrix} + (1-m)\begin{pmatrix}P(x-3,y,\frac{1}{2})\\P(x-2,y,\frac{1}{2})\\P(x-1,y,\frac{1}{2})\\P(x,y,\frac{1}{2})\\P(x+1,y,\frac{1}{2})\\P(x+2,y,\frac{1}{2})\\P(x+3,y,\frac{1}{2})\end{pmatrix}\right|$$

where "0" denotes the input frame preceding the frame to be interpolated and "1/2" the input frame following the frame to be interpolated, and where m represents a weighting coefficient depending on the temporal position of the frame to be interpolated between the input frames.

11. Process according to claim 9 wherein
the interpolation of a pixel (P(x,y)) of a line of given parity of a frame (1) whose lines of opposite parity are equal to the lines of an input frame (1) is carried out, when the associated motion vector is not zero or the confidence accorded to this vector is low, through median filtering (P1 (x,y)) pertaining to the values obtained
firstly by vertical linear filtering (F1),
secondly by vertical spatio-temporal median filtering on two pixels and motion-compensated on one pixel (F2) and
thirdly by spatio-temporal median filtering pertaining to four pixels in a cross and motion-compensated on one pixel (F3).

12. Process according to claim 11, wherein the said vertical linear filtering (F1) is as follows:

$$F1(x, y) = \frac{1}{2}\left(P\left[\begin{pmatrix}x\\y-1\end{pmatrix},0\right] + P\left[\begin{pmatrix}x\\y+1\end{pmatrix},0\right]\right)$$

where "0" represents the temporal position of the frame to be interpolated.

13. Process according to claim 11 wherein the said vertical spatio-temporal filtering on two pixels and motion-compensated on a pixel (F2) is:

$$F2(x, y) = med\left(P\left[\begin{pmatrix}x\\y-1\end{pmatrix},0\right]; P\left[\begin{pmatrix}x\\y+1\end{pmatrix},0\right]; P\left[\begin{pmatrix}x+v_x\\y+v_y\end{pmatrix},\frac{1}{2}\right]\right)$$

where Vx and Vy are the coordinates of a motion vector associated with the pixel to be interpolated, and where "0" represents the frame to be interpolated and "1/2" the following input frame.

14. Process according to claim 11 wherein the said spatio-temporal filtering pertaining to four pixels in a cross and to a motion-compensated pixel (F3) is:

$$F3(x, y) = med\left(P\left[\begin{pmatrix}x-1\\y-1\end{pmatrix},0\right]; P\left[\begin{pmatrix}x-1\\y+1\end{pmatrix},0\right];\right.$$
$$\left.P\left[\begin{pmatrix}x+1\\y-1\end{pmatrix},0\right]; P\left[\begin{pmatrix}x+1\\y+1\end{pmatrix},0\right]; P\left[\begin{pmatrix}x+v_x\\y+v_y\end{pmatrix},\frac{1}{2}\right]\right)$$

15. Process according to claim 11 wherein when the motion vector associated with a pixel to be interpolated is zero and the confidence in this vector is greater than a given threshold, then the said pixel takes the value of the pixel with the same position in the following input frame.

16. A process for converting interlaced frames into progressive frames comprising a change of frame frequency by interpolation and motion compensation wherein
when a motion vector associated with a pixel to be interpolated is non-zero or when this vector is zero, but a confidence level accorded to this vector is less than a given threshold,
the interpolation of a pixel (x,y) of a frame situated temporally between two input frames is carried out by a first motion-compensated linear temporal filter for obtaining a first interpolated pixel value based on at least two pixels a, b associated with said two input frames, a second motion-compensated linear filter for obtaining a second interpolated pixel value based on at least two pixels b, c associated with said two input frames, a motion-compensated median temporal filter for obtaining a median pixel value based on at least three pixels a, b, c associated with said two input frames; and median filtering according to said first and second interpolated pixel values and said median pixel value to obtain a value corresponding to the interpolation of said pixel (x,y).

* * * * *